United States Patent [19]
Tanaka et al.

[11] Patent Number: 5,381,396
[45] Date of Patent: Jan. 10, 1995

[54] MAGNETO-OPTICAL RECORDING METHOD AND APPARATUS FOR RECORDING INFORMATION ON A MAGNETO-OPTICAL RECORDING MEDIA

[75] Inventors: Tsutomu Tanaka; Keiji Shono; Yoshiyuki Namba; Koji Matsumoto; Miyozo Maeda, all of Kawasaki, Japan

[73] Assignee: Fujitsu Limited, Kawasaki, Japan

[21] Appl. No.: 93,641

[22] Filed: Jul. 20, 1993

[30] Foreign Application Priority Data

Oct. 15, 1992 [JP] Japan .................................. 4-277535
May 7, 1993 [JP] Japan .................................. 5-106941

[51] Int. Cl.⁶ ............................................ G11B 11/10
[52] U.S. Cl. ...................................... 369/116; 369/59; 369/13
[58] Field of Search ................ 369/112, 116, 59, 60, 369/100, 13; 360/114

[56] References Cited

U.S. PATENT DOCUMENTS 5,144,601 9/1992 Maeda et al. .................. 369/59

Primary Examiner—Paul M. Dzierzynski
Assistant Examiner—Don Wong
Attorney, Agent, or Firm—Armstrong, Westerman, Hattori, McLeland & Naughton

[57] ABSTRACT

A process for recording information on a magneto-optical recording medium according to a (2, 7) RLL modulated signal includes a step of setting an optical power of a laser beam to a high level state in response to a logic value "1" and a step of alternately switching the optical power of the laser beam between the high level state and a low level state in correspondence to a logic value "0" except for the bit that is immediately adjacent to the bit of the logic value "1."

6 Claims, 32 Drawing Sheets

FIG.13 (A) REC PULSE

FIG.13 (B) REC MARK

FIG.24 (A)

| | | |
|---|---|---|
| 64 | Y–SiO$_2$ | 85nm |
| 63 | Tb$_2$ Dy$_{24}$ Fe$_{44}$ Co$_{30}$ | 80nm |
| 62 | Tb$_{20}$ Fe$_{72}$ Co$_8$ | 30nm |
| 61 | Y–SiO$_2$ | 85nm |
| 11 | SUBSTRATE | |

FIG.24 (B)

| | | |
|---|---|---|
| 64 | Y–SiO$_2$ | 85nm |
| 63 | Tb$_2$ Dy$_{24}$ Fe$_{44}$ Co$_{30}$ | 80nm |
| 65 | Gd$_{32}$ Fe$_{44}$ Co$_{20}$ | 10nm |
| 62 | Tb$_{20}$ Fe$_{72}$ Co$_8$ | 30nm |
| 61 | Y–SiO$_2$ | 85nm |
| 11 | SUBSTRATE | |

FIG.24 (C)

| | | |
|---|---|---|
| 66 | Al | 50nm |
| 64 | Y–SiO$_2$ | 30nm |
| 63 | Tb$_2$ Dy$_{24}$ Fe$_{44}$ Co$_{30}$ | 50nm |
| 65 | Gd$_{32}$ Fe$_{44}$ Co$_{20}$ | 10nm |
| 62 | Tb$_{20}$ Fe$_{72}$ Co$_8$ | 30nm |
| 61 | Y–SiO$_2$ | 85nm |
| 11 | SUBSTRATE | |

FIG.33 (A)

| # | Layer | Thickness |
|---|---|---|
| 64 | Y−SiO$_2$ | 85nm |
| 71 | Tb$_{27}$ Fe$_{25}$ Co$_{48}$ | 40nm |
| 70 | Tb$_{18}$ Fe$_{80}$ Co$_2$ | 20nm |
| 63 | Tb$_2$ Dy$_{24}$ Fe$_{44}$ Co$_{30}$ | 50nm |
| 62 | Tb$_{20}$ Fe$_{72}$ Co$_8$ | 30nm |
| 61 | Y−SiO$_2$ | 85nm |
| 11 | SUBSTRATE | |

FIG.33 (B)

| # | Layer | Thickness |
|---|---|---|
| 64 | Y−SiO$_2$ | 85nm |
| 71 | Tb$_{27}$ Fe$_{25}$ Co$_{48}$ | 40nm |
| 70 | Tb$_{18}$ Fe$_{80}$ Co$_2$ | 20nm |
| 63 | Tb$_2$ Dy$_{24}$ Fe$_{44}$ Co$_{30}$ | 50nm |
| 65 | Gd$_{32}$ Fe$_{44}$ Co$_{20}$ | 10nm |
| 62 | Tb$_{20}$ Fe$_{72}$ Co$_8$ | 30nm |
| 61 | Y−SiO$_2$ | 85nm |
| 11 | SUBSTRATE | |

MAGNETO-OPTICAL RECORDING METHOD AND APPARATUS FOR RECORDING INFORMATION ON A MAGNETO-OPTICAL RECORDING MEDIA

BACKGROUND OF THE INVENTION

The present invention relates to magneto-optical recording method for recording information on a magneto-optical recording media and a recording apparatus used therefore, and more particularly to a magneto-optical recording method for overwriting a magneto-optical disk by a modulated optical beam and a recording apparatus used therefore.

Magneto-optical recording media such as rewritable magneto-optical recording disks are recorded with information by means of a modulated laser beam in the form of recording mark. The recording mark typically has a sub-micron size. The information thus recorded on the disk is read out therefrom also by a laser beam. Thereby, a significant increase in the recording capacity is achieved over conventional recording media such as flexible magnetic disks or hard disks. Thus, intensive efforts are being made on magneto-optical recording apparatuses to realize largecapacity, external storage device of computers.

For example, a magneto-optical disk having a diameter of 3.5 inches typically has a storage capacity of about 128 Mbytes on each side. On the other hand, flexible magnetic disks of the same diameter can provide only about 1 Mbytes of storage capacity on each side. This means that a single magneto-optical disk can provide storage capacity comparable to the storage capacity of about 128 flexible magnetic disks. In addition, the magneto-optical disks are replaceable similarly to flexible magnetic disks and provides distinct advantage over fixed storage devices such as hard disk.

On the other hand, magneto-optical disks generally have a drawback in the point that data transfer is slow. For example, a data transfer rate of about 640 kB/sec is common for magneto-optical disks revolved at a speed of 2400–3000 rpm, while a data transfer rate of about 3 Mbytes/sec is achieved in the hard disks revolving at a speed of 3600 rpm. The reason of this undesirable result is attributed to the recording process adopted in the magneto-optical disk devices. It should be noted that overwrite recording of information, generally employed in the hard disk devices, cannot be employed in the conventional magneto-optical disk devices. In order to write information on a recorded disk, one has to erase a recording track before starting recording of information. Thereby, the disk is required to revolve for one turn to achieve erasing and another one turn for verifying. Obviously, the process for erasing track is extraneous and decreases the data transfer rate.

In order to avoid the foregoing problem, efforts have been made to develop magneto-optical disks that allows overwrite recording. In order that such overwrite magneto-optical disks are accepted in the society, it is necessary to reduce the circuits that are added to the currently used system as much as possible to reduce the size as well as the cost of the recording apparatus.

Conventionally, so-called magnetic modulation process and optical modulation process are developed as candidate processes for overwriting a magneto-optical disk. In the magnetic modulation process, a magneto-optical disk having a single layer of magnetic coating is employed, and overwrite recording is achieved by means of a magnetic head while irradiating the magneto-optical disk continuously by a laser beam. In this process, therefore, the magnetic field applied to the magneto-optical disk is selectively inverted in response to recording information by the magnetic head. Thus, the speed of overwrite recording in this process is limited by the speed of magnetic inversion in the magnetic head.

On the other hand, the optical modulation process uses a magneto-optical disk that carries thereon a plurality of magnetic coatings, and the overwrite recording is achieved by changing the intensity of the laser beam. In this process, therefore, the speed of overwrite recording is determined mainly by the modulation speed of the laser beam intensity and one can obtain a superior operational speed over the magnetic modulation process.

Hereinafter, the principle of the overwrite recording according to the optical modulation process will be described with reference to FIG. 1 that shows the cross sectional structure of an exchange-coupled layered recording medium. As shown in FIG. 1, the recording medium is constructed on a disc-shaped, transparent substrate 1 and includes a protective layer 2, a memory layer 3, an intermediate layer 4, a recording layer 5 and another protective layer 6, wherein the layers 2–6 are deposited consecutively on the substrate 1. Thereby, the layers 3–5 form a three-layered recording structure. FIG. 2 shows the temperature-versus-coercive force characteristics of the memory layer 3 and the recording layer 5, wherein the characteristic for the memory layer 3 is designated as I and the characteristic for the recording layer 5 is designated as II. As indicated in FIG. 2, the memory layer 3 has a Curie temperature Tc that is lower than the Curie temperature Tc of the recording layer 5. On the other hand, the memory layer 3 has a coercive force Hc that is larger than the coercive force Hc of the recording layer 5 at the room temperature. The intermediate layer 4 is provided to control the exchange coupling between the memory layer 3 and the recording layer 5. Further, FIG. 2 shows the initializing magnetic field $H_{ini}$ to be described later.

Next, the conventional overwriting process will be described. For the sake of simplicity, the erasing process and the recording process are described separately. When erasing, the magneto-optical disk is applied with the initializing magnetic field $H_{ini}$ such that the magnetization is aligned in the direction of the magnetic field $H_{ini}$ as indicated schematically in FIG. 3. During this process, the magnetization of the memory layer 3 is not affected, as the magnetic disk is held in the room temperature environment and the portion of the magneto-optical disk that is applied with the magnetic field $H_{ini}$ is also held at the room temperature.

Next, the magneto-optical disk is applied with a bias magnetic field $H_b$ in correspondence to the portion that has been applied with the initializing magnetic field $H_{ini}$, and a laser beam 8 scans the surface of the magnetic disk with a first, reduced optical power $P_L$. Thereby, the memory layer 3 is heated to a temperature that causes an inversion of magnetization. On the other hand, this temperature is below the Curie temperature Tc of the recording layer 5, and no inversion of the magnetization occurs in the recording layer 5.

As a result, the portion of the memory layer 3 that is irradiated by the laser beam experiences inversion of magnetization as a result of the magnetic exchange coupling with the recording layer in coincidence to the direction of magnetization of the recording layer 5, and erasing of information is achieved thereby. In FIG. 3, $P_1$ represents the region wherein erasing has been achieved and $P_2$ represents the region wherein previous recording of information has not been erased yet.

Next, recording of information will be described with reference to FIG. 4. As indicated in FIG. 4 schematically, a laser beam 8' having an increased optical power $P_H$ is produced and radiated upon the magneto-optical disk. In correspondence to the portion of the magneto-optical disk that is irradiated by the laser beam 8', it will be noted that a bias magnetic field $H_b$ is applied. Further, in correspondence to the portion of the magneto-optical disk that precedes the portion of optical irradiation, an initializing magnetic field $H_{ini}$ is applied in the direction opposite to the direction of the bias magnetic field Hb.

As the laser beam 8' is set to have a high optical power $P_H$, the recording layer 5 experiences a temperature elevation above the Curie temperature in correspondence to the portion irradiated by the laser beam, and the portion of the magneto-optical disk that has been irradiated by the optical beam 8' is magnetized in the direction of the bias magnetic field Hb. In addition, the memory layer 3 experiences a temperature rise above the Curie point and magnetized in the direction of the bias magnetic field Hb. Thereby, recording of information is achieved. In FIG. 4, the region designated as $P_3$ represents the region wherein the recording of information has been achieved while the region designated as $P_4$ represents the erased region wherein recording has not been achieved yet. When recording information, the laser beam is subjected to an amplitude modulation such that the optical power of the laser beam is set to the foregoing high optical power $P_H$ in correspondence to logic value "1" of the recording data and to the low optical power in correspondence to the logic value "0."

In the actual overwrite recording process, a recording is achieved on the portion of the recording medium that has been erased previously with the low optical power $P_L$, by means of the laser beam having the high optical power $P_H$ as indicated in FIG. 30. In the illustration of FIG. 15, it should be noted that $P_R$ represents the optical power used for reading.

As another recording method that uses an optical modulation process, there is a proposal to use a magneto-optical disk having a four-layer structure that includes a magnetic layer acting as the initializing magnet (Nikkei Electronics, 1990. 8. 6., pp. 173–180). Thereby, one can omit the initializing magnet.

On the other hand, the foregoing conventional recording process has a drawback in the point that the optimum recording power may change depending on the recording pattern. Hereinafter, this problem will be examined in detail with reference to the case of recording data in the form of (2, 7) run-length-limited modulation process designated hereinafter as (2, 7)RLL process. In the (2, 7)RLL process, a data word of m bits and having a bit interval $\tau$ is converted to an RLL code word of 2 m channel bits, wherein m=2, 3, 4.

It should be noted that RLL code is formed according to a rule such that two adjacent channel bits having a logic value "1" are separated from each other by at least two, but smaller than eight digits of data "0." Thus, the interval between two adjacent recording marks becomes minimum when the RLL format of the recording data has a three channel-bit interval ($1.5\tau$ signal), wherein two adjacent channel bits "1" are separated by two bits of logic value "0." On the other hand, the interval between the recording bits becomes maximum when the RLL format of the recording data has eight channel-bit interval ($4\tau$ signal) wherein two adjacent channel bits "1" are separated from each other by seven bits of logic value "0."

In the pit-position recording method known also as mark interval recording method, the magneto-optical recording medium is recorded with a recording mark (pit) in response to the logic value "1" of the RLL signal, while the recording of the mark is suppressed in correspondence to the logic value "0" of the RLL signal. Thereby, recording marks are recorded on the magneto-optical disk in the form of recording mark as indicated in FIGS. 6(A) and 6(B), wherein FIG. 6(A) shows the pattern corresponding to continuous recording of the $1.5\tau$ signal while FIG. 6(B) shows the pattern corresponding to continuous recording of the $4\tau$ signal.

FIG. 7 shows the C/N map indicative of an iso-C/N ratio contour line for various combinations of the setting for the high optical power level $P_H$ and the setting for the low optical power level $P_L$. The result shown in FIG. 7 is obtained for a magneto-optical disk revolving at a line velocity of 9 m/sec, by recording a $1.5\tau$ signal continuously after erasing and further overwriting the $1.5\tau$ signal by a $4\tau$ signal as indicated by broken lines III-1 and III-2. Further, FIG. 7 shows the result obtained for the same magneto-optical disk revolving at the same speed, by recording a $4\tau$ signal after erasing and overwriting the $4\tau$ signal by a $1.5\tau$ signal by continuous lines IV-1 and IV-2.

As indicated in the broken lines III-1 and III-2, one has to set the optical power $P_L$ to have a value of about 3.5–5 mW and the optical power $P_H$ to have a value of about 7 mW or more, in order to obtain a practical C/N ratio of 45 dB or more when overwriting the magneto-optical disk with the $4\tau$ signal.

On the other hand, as indicated in the continuous lines IV-1 and IV-2, it is necessary to set the optical power $P_L$ to be less than 3 mW and the optical power $P_H$ to have a value of about 8 mW, in order to achieve the practical C/N ratio of 45 dB or more when overwriting the magneto-optical disk with the $1.5\tau$ signal. The result of FIG. 7 indicates that the optimum combination of the optical power $P_L$ and $P_H$ changes depending upon the recording data, and that it is difficult to obtain satisfactory recording of data as long as the optical power level $P_L$ and the optical power level $P_H$ are fixed. This problem of variation of the optimum optical power when recording the $1.5\tau$ signal and when recording the $4\tau$ signal becomes particularly conspicuous with respect to the setting of the optical power $P_L$.

The foregoing result that the optimum setting of the low optical power $P_L$ changes depending on the recording pattern is believed to be caused by the fact that one needs to use a large optical power in order to heat the magneto-optical recording medium to a temperature wherein erasing of information occurs, provided that the recording marks are separated form each other by a large interval as in the case of the $4\tau$ signal. When the interval between the recording marks is small as in the case of recording the $1.5\tau$ signal, on the other hand, the diffusion of heat from the part of the magneto-optical disk irradiated by the optical power $P_H$, induces a temperature rise and a small optical power is sufficient for the optical power $P_L$ to cause the desired erasing. In addition, the recording of pit on the recording medium with high optical power beam causes erasing of information in correspondence to the part located adjacent to the pit.

FIGS. 8(A) and 8(B) explain the foregoing principle. When a magneto-optical disk is irradiated by a laser beam having a high optical power $P_H$ in correspondence to an interval between $t_1$ and $t_4$ as indicated in FIG. 8(A), the temperature of the magneto-optical disk rises in the irradiated portion as indicated in FIG. 8(B), wherein an erase temperature $T_{PL}$ is reached at a timing $d_2$ that is immediately after the timing $t_1$. The temperature rises further and reaches a write temperature $T_{PH}$ at a timing $d_3$. The temperature further rises after the timing $d_3$ and only to start decrease in correspondence to the timing $t_4$. Thus, the foregoing write temperature $T_{PH}$ is attained at the timing $d_4$ and the erase temperature $T_{PL}$ is reached in correspondence to the timing $d_5$.

Thus, recording of pit (recording mark) is achieved in correspondence to the interval between the timing $d_3$ and $d_4$ in which the temperature of the recording medium is higher than the write temperature $T_{PH}$. Further, erasing is achieved in correspondence to the intervals $d_2$–$d_3$ and $d_4$–$d_5$ located before and after the foregoing interval $d_3$–$d_4$. Particularly, it should be noted that the erasing is achieved in correspondence to the interval $d_4$–$d_5$ without irradiating laser beam. Thus, when recording data characterized by very small interval between the recording pulses, it is even possible to erase the previous recording simultaneously to the recording, without irradiating low optical power laser beam. The foregoing analysis clearly indicates that the optimum value for the optical power level $P_L$ changes depending on the recording pattern.

As such, it is necessary to construct an optical recording apparatus such that the laser power can be changed variously depending upon the recording data such that the laser optical power is held optimum. However, such a control of the optical power of the laser diode requires multiple-level control so as to control the optical power in more than three levels while such a multiple-level control requires a complex control circuit that increases the size and cost of the recording apparatus.

SUMMARY OF THE INVENTION

The present invention is invented in view of the foregoing various problems. More specifically, it is the object of the present invention to provide a magneto-optical recording method and apparatus wherein the foregoing problems are eliminated by modifying the waveform of recording pulses.

According to a first aspect of the present invention, there is provided a magneto-optical recording method for recording information on a magneto-optical recording medium in response to a binary recording pulse, said binary recording pulse being modulated such that at least those bits located before and after a bit that has a first logic value, have a second, opposite logic value, said information being recorded on said magneto-optical recording medium by means of a laser beam in the form of a recording mark such that said recording mark is formed, in response to said recording pulse having said first logic value, by radiating said laser beam having a first laser power, and such that formation of said recording mark on said magneto-optical recording medium is suppressed, in response to said recording pulse having said second logic value, by radiating said laser beam that has a second laser power, characterized in that: said step of irradiating said magneto-optical recording medium with said second laser power is conducted by alternately repeating the steps of: (a) irradiating said magneto-optical recording medium with said first laser power except for a region of said magneto-optical recording medium immediately adjacent to said recording mark; and (b) irradiating said magneto-optical recording medium with said second laser power; said steps (a) and (b) being repeated for a predetermined number of times to erase information from said magneto-optical recording medium.

According to said second aspect of the present invention, said step of irradiating said magneto-optical recording medium with said second laser power is conducted by conducting the steps of: (a) irradiating said magneto-optical recording medium with a third laser power that is smaller than any of said first and second laser powers in correspondence to a region of said magneto-optical recording medium that is recorded immediately after recording of said recording mark; and (b) after said step of (a), repeatedly and alternately conducting the steps of: (b-1) irradiating said magneto-optical recording medium with said first laser power except for a region of said magneto-optical recording medium immediately adjacent to said recording mark; and (b-2) irradiating said magneto-optical recording medium with said second laser power; said steps (b-1) and (b-2) being repeated for a predetermined number of times to erase information from said magneto-optical recording medium.

According to a third aspect of the present invention, there is provided a magneto-optical recording apparatus for recording information on a magneto-optical recording medium in the form of a recording mark in response to binary recording pulses, comprising: a laser diode supplied with said binary recording pulses for producing a modulated laser beam in response thereto, said binary recording pulses including bits and being modulated such that at least those bits located before and after a bit that has a first logic value, have a second, opposite logic value; an optical system for irradiating said magneto-optical recording medium with said laser beam produced by said laser diode such that said laser beam has a first laser power when said recording pulse has said first logic value and such that said laser beam has a second laser power when said recording pulse has said second logic value, said first laser power being set such that recording of said recording mark upon said magneto-optical is achieved, said second laser power being set such that recording of said recording mark upon said magneto-optical recording medium is suppressed; and laser diode control means supplied with said binary recording pulses for producing a pulse train including a plurality of pulses each having a pulse width smaller than a period of said bit having said first logic value, said laser diode control means producing said pulse train in correspondence to the bit having said second logic value, said plurality of pulses forming said pulse train including therein a first pulse having said first logic value and a second pulse having said second logic value that said first pulse and said second pulse are repeated alternately, said laser diode control means driving said laser diode such that said laser power of said laser diode is switched alternately between said first laser power and said second laser power in response to said first and second pulses of said pulse train, said laser diode control means further driving said laser diode such that said laser power is set to said first laser power in response to said bit having said first logic value and such that said laser power is set to said second laser power in correspondence to said bit having said second logic value and located immediately adjacent to said bit of said first logic value.

According to a fourth aspect of the present invention, said laser diode control means is supplied with said binary recording pulses and produces a pulse train including a plurality of pulses each having a pulse width smaller than a period of said bit having said first logic value, said laser diode control means producing said pulse train in correspondence to the bit having said second logic value such that said pulse train includes therein a first pulse having said first logic value, a second pulse having said second logic value and a third pulse having said third logic value such that said third pulse is formed immediately after said bit having said first logic value and such that said first pulse and said second pulse are repeated alternately after said third pulse, said laser diode control means driving said laser diode such that said laser power of said laser diode is set to a third laser power in correspondence to said third pulse and such that said laser power is switched alternately between said first laser power and said second laser power in response to said first and second pulses of said pulse train, said laser diode control means further driving said laser diode such that said laser power is set to said first laser power in response to said bit having said first logic value.

According to the foregoing first aspect of the present invention, the recording mark is written on a magneto-optical recording medium with a first laser power $P_H$ in response to a first logic value "1" of the recording pulse, while the formation of the recording mark on the magneto-optical recording medium is suppressed in response to a second logic value "0" of the recording pulse by irradiating the magneto-optical recording medium with a second laser power $P_L$ as indicated in FIG. 9 to be described later, wherein the area of the magneto-optical recording medium that is irradiated in response to the second logic value of the recording pulse is irradiated alternately by the laser beam having the first power $P_H$ and the laser beam having the second power $P_L$, except for those portions immediately adjacent to the recording mark formed in response to the bit of the recording pulse having the first logic value, by switching the optical power alternately for a predetermined number of times.

Thereby, the magneto-optical recording medium is irradiated, in correspondence to the interval between A and B, by the laser beam having the first optical power $P_H$ intermittently such that the temperature rise above the write temperature does not occur, and the formation of the recording mark on the recording medium is suppressed. On the other hand, the temperature of the recording medium is increased above the erase temperature as a result of such an intermittent radiation of the laser beam. Thus, even in the case where the recording marks are formed on the magneto-optical recording medium with a substantial mutual separation, it is possible to maintain the magneto-optical recording medium at a temperature close to the foregoing erase temperature.

On the other hand, it should be noted that the region of the magneto-optical recording medium that is adjacent to the recording mark written with the first laser power $P_H$ (regions C and D in FIG. 9) experiences lowering of the temperature because of the irradiation by the second laser power $P_L$. Thereby, unwanted rise of the temperature of the magneto-optical recording medium above the write temperature is avoided even in the case where the interval between the recording marks is small.

According to the second aspect of the present invention, the recording of the bit "0" after the process of recording the bit "1" is achieved by first setting the laser power to a third power $P_R$ that is smaller than any of the foregoing first and second powers $P_H$ and $P_L$, and then by irradiating alternately with the first power $P_H$ and the second power $P_L$.

Thereby, the recording of the bit "0" on the magneto-optical recording medium is achieved by intermittently irradiating with the laser beam with the optical power of $P_H$, and the temperature rise above the write temperature is avoided. On the other hand, the magneto-optical recording medium is held at a temperature above the erase temperature as a result of the intermittent radiation of the laser beam with the power $P_H$, even when the interval between the recording marks is large.

It should be noted that the alternate radiation of the laser diode with the first optical power $P_H$ and the second optical power $P_L$ is achieved after the laser diode optical power is set to the third power level $P_R$. Thereby, cooling of the magneto-optical recording medium is guaranteed in correspondence to the irradiation with the third optical power $P_R$, and excessive temperature rise of the magneto-optical recording medium beyond the write temperature is avoided, particularly in correspondence the part of the recording medium that follows immediately the part wherein the recording of the recording mark has been made.

According to the present invention as set forth heretofore, one can control the temperature of the magneto-optical recording medium above the erase temperature but below the write temperature, irrespective of the interval between the recording marks. The present invention achieves the foregoing temperature control by means of the laser diode control means that controls the driving of the laser diode as set forth in FIG. 9.

BRIEF DESCRIPTION OF THE DRAWINGS

FIGS. 24(A)–24(C) are diagrams showing the cross sectional structure of the magneto-optical disks used in the present invention;

FIGS. 33(A) and 33(B) are diagrams showing the cross sectional structure of a magneto-optical disk used in the present invention.

DETAILED DESCRIPTION OF PREFERRED EMBODIMENTS

Figure 9:
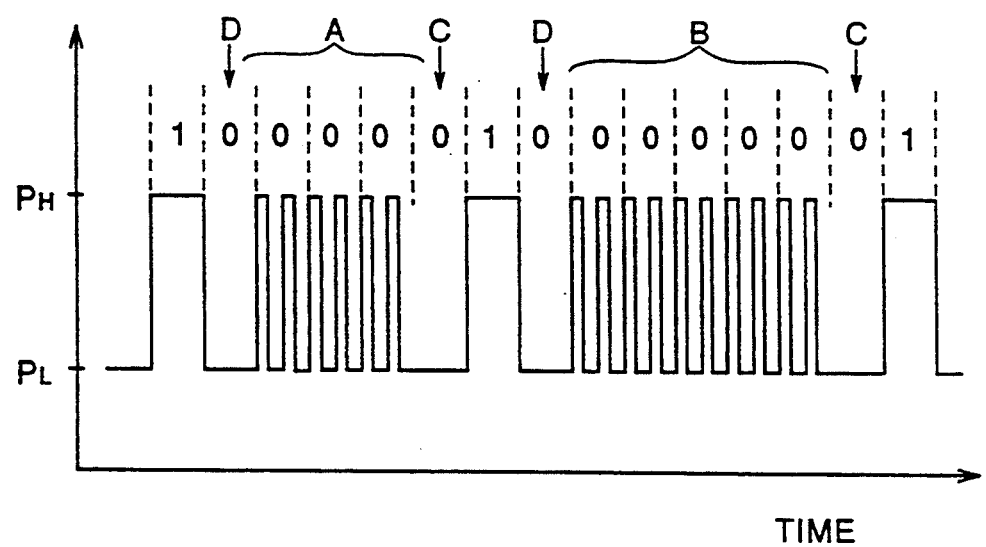
FIG. 9 is a diagram showing the function of the present invention.

Next, a first embodiment of the magneto-optical recording method according to the present invention will be described. The present embodiment achieves an overwrite recording according to the optical modulation process described with reference to FIG. 9, and uses a magneto-optical disk 10 having a cross sectional structure shown in FIG. 10 as the magneto-optical recording medium. The magneto-optical disk 10 shown in FIG. 10 has a disk shape and is constructed on a glass substrate 11 having a thickness of 1.2 mm. The glass substrate 11 is formed with a laser beam guide groove not illustrated. On the substrate 11, there is provided a Tb-SiO$_2$ layer 12 having a thickness of 80 nm, and a memory layer 13 of Tb$_{18}$Fe$_{77}$Co$_5$ is deposited on the layer 12 with a thickness of 30 nm by a sputtering process. Thereby, the layer 12 acts as the memory layer. Further, a layer 14 of the composition Tb$_{12}$Co$_{43}$Cu$_{45}$ is deposited on the layer 13 with a thickness of 5 nm, and another layer 15 of the composition Tb$_5$Dy$_{23}$Fe$_{32}$Co$_{40}$ is deposited on the layer 14 with a thickness of 50 nm. Further, a layer 16 of Tb-SiO$_2$ is deposited on the layer 15 with a thickness of 80 nm.

Figure 1:
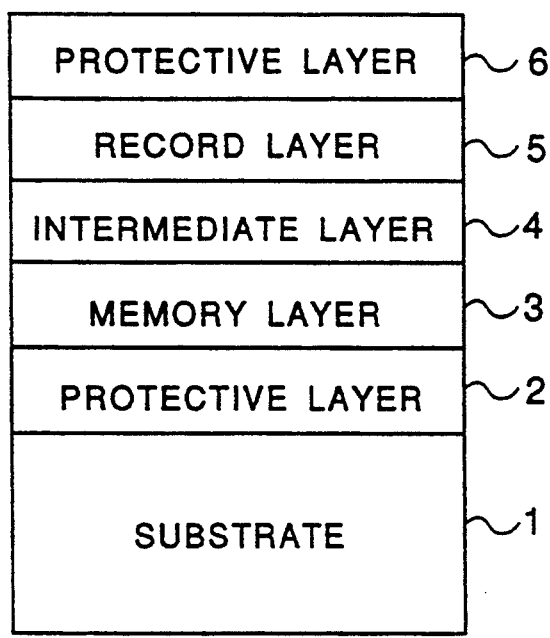
FIG. 1 is a diagram showing an example of the cross sectional structure of a magneto-optical disk used in the optical modulation recording process.
Figure 2:
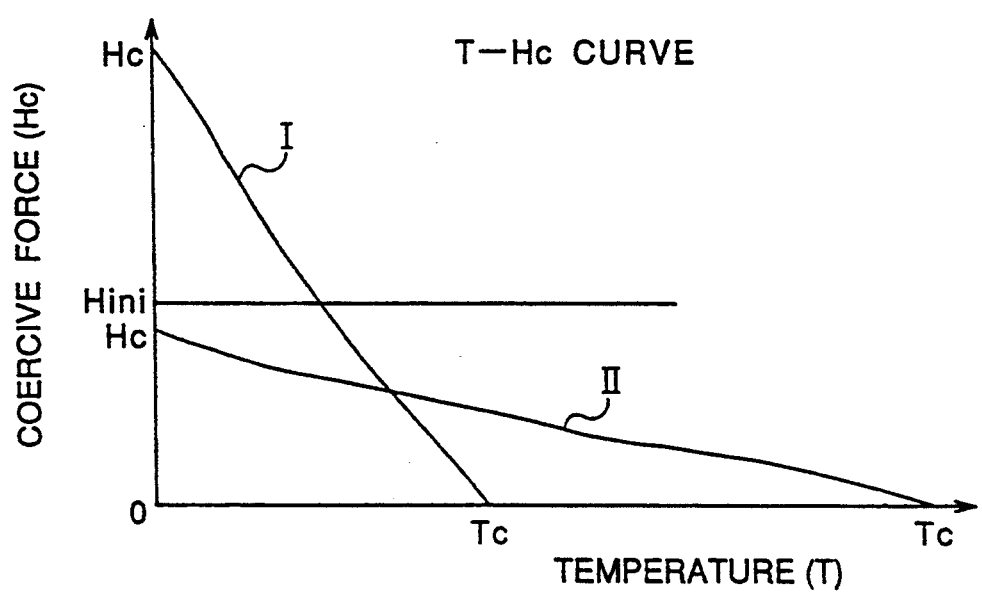
FIG. 2 is a diagram showing the magnetic characteristics of the recording medium of FIG. 1.
Figure 3:
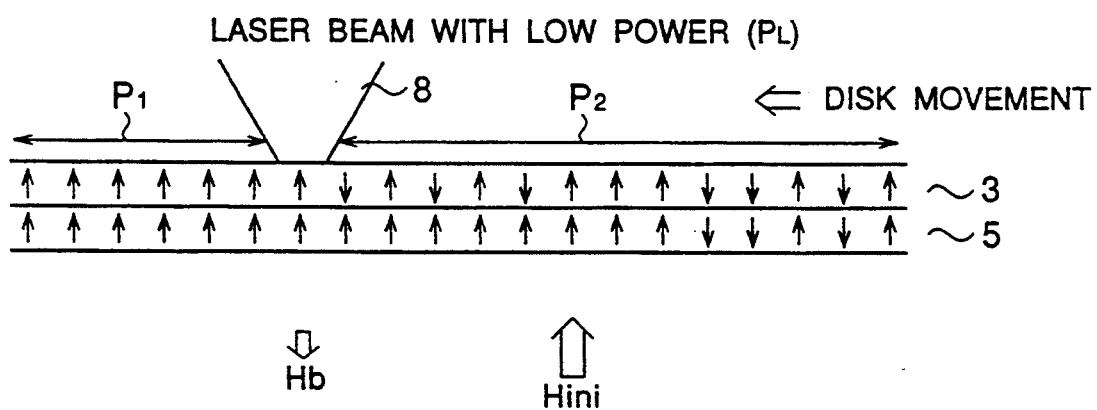
FIG. 3 is a diagram for explaining the conventional erasing process.
Figure 10:
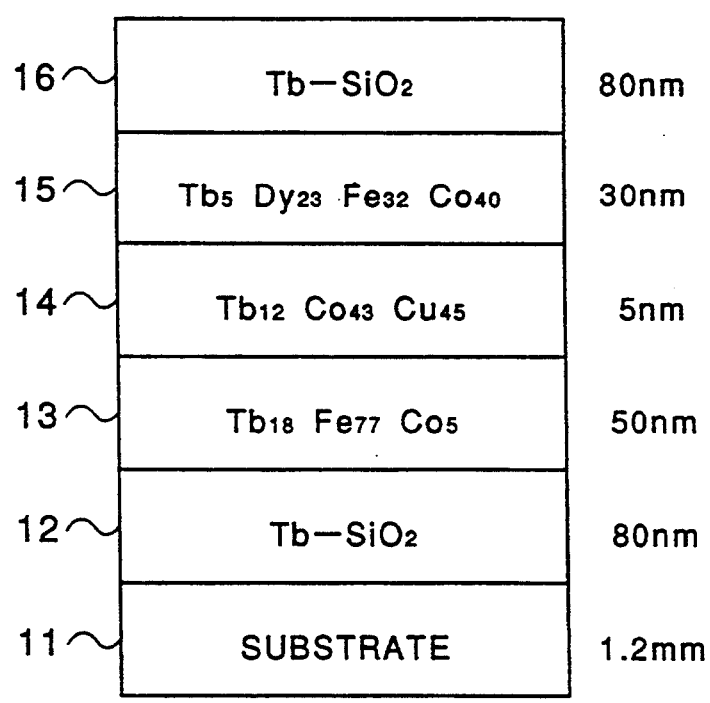
FIG. 10 is a diagram showing the cross sectional structure of a magneto-optical disk used in the present invention.

In the foregoing structure, the Tb-SiO$_2$ layers 12 and 16 act as a protective layer, while the layer 14 of the composition Tb$_{12}$Co$_{43}$Cu$_{45}$ acts as the intermediate layer. On the other hand, the layer 15 of the composition Tb$_5$Dy$_{23}$Fe$_{32}$Co$_{40}$ acts as the recording layer. Thus, the magneto-optical disk 10 of FIG. 10 has the three-layer structure similarly to the conventional magneto-optical disks described previously, and information is recorded on the Tb$_{18}$Fe$_{77}$Co$_5$ layer 13 in the form of magnetization as a result of the exchange coupling between the magnetic layers 13 and 15. It should be noted that the magneto-optical disk 10 of FIG. 10 shows the characteristics described with reference to FIG. 2. Thereby, the erasing process of the disk 10 is substantially identical with the process described with reference to FIG. 3.

In the present embodiment, the recording pulses formed as a result of the (2,7)RLL modulation is recorded on the magneto-optical disk 10 such that a recording mark is formed on the magneto-optical disk in the form of inverted magnetization in response to the logic value "1" of the recording pulse by the laser beam having the first power P$_H$. The formation of the recording mark on the magneto-optical disk is suppressed, on the other hand, in response to the logic value "0" of the recording pulse by setting the optical power of the laser beam to the second optical power P$_L$. In the present embodiment, it should be noted that the recording of the data "0" is achieved by alternately switching the optical power of the laser diode between the level P$_H$ and the level P$_L$, except for the data "0" that is included in the channel bit immediately adjacent to the channel bit for the data "1." Thereby, the alternate switching of the optical power is achieved so as to produce pulses each having a pulse width substantially smaller than the bit interval.

Figure 11:
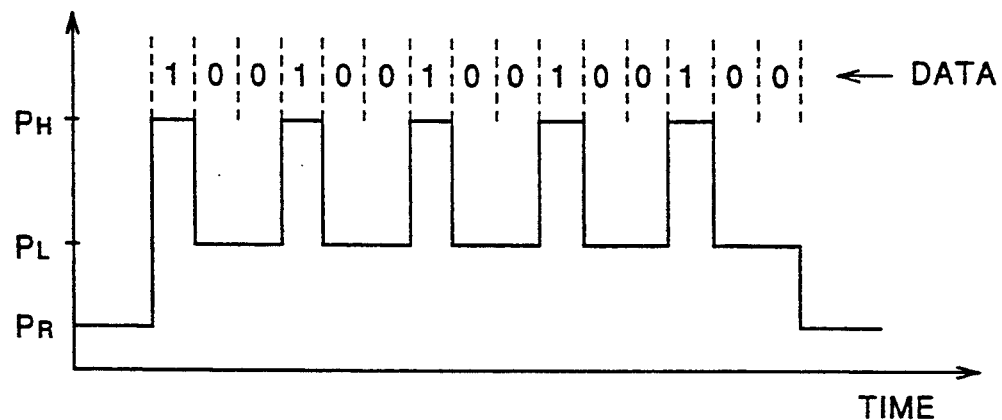
FIGS. 11(A) and 11(B) are diagrams showing the laser pattern for recording a 1.5τ signal and a 4τ signal according to an embodiment of the present invention.
Figure 11:
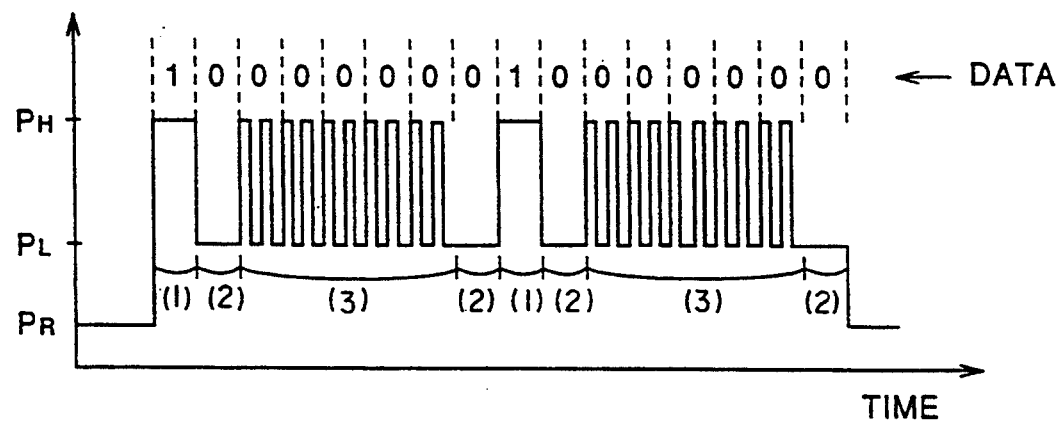

FIGS. 11(A) and 11(B) show the recording achieved according to the first embodiment of the present invention, wherein it will be noted that a recording pulse shown in FIG. 11(A) is employed for recording a 1.5τ signal, while a recording pulse shown in FIG. 11(B) is used for recording a 4τ signal. It should be noted that FIG. 11(A) shows the (2,7)RLL modulated recording pulse corresponding to the 1.5τ signal that is characterized by the smallest mark interval. As indicated in FIG. 11(A), the signal includes two bits of the logic value "0" formed adjacent with each other so as to separate a pair of bits of the logic value "1." In other words, the bit "0" in FIG. 11(A) is formed immediately adjacent to the bit "1," and the formation of the recording mark is achieved substantially identically with the conventional process for recording the recording pulse of FIG. 6(A). In the illustrated example, each of the bits "0" and "1" has a pulse width of 60 ns.

On the other hand, when the $4\tau$ signal that has the largest mark interval is to be recorded on the magneto-optical recording medium as indicated in FIG. 11(B), it will be noted that there are seven bits of logic value "0" included between a pair of two bits of the logic value "1." Thereby, there are five bits of the logic value "0" that are not formed immediately adjacent to the bit of the logic value "1," and each of these five bits includes a pair of pulses having a pulse width of 15 ns, wherein the foregoing pulse pair includes a first pulse of the optical level $P_H$ and a second pulse of the optical level $P_L$.

Thus, the waveform of the $4\tau$ signal includes: a first interval (1) corresponding to the bit of the logic value "1" and characterized by the optical power level $P_H$; a second interval (2) corresponding to the bit of the logic value "0" and characterized by the optical power level $P_L$; and a third interval (3) corresponding to the bit of the logic value "0" and formed away from the bit "1," wherein the optical power is changed alternately between the level $P_H$ and the level $P_L$ in correspondence to the third interval (3). Thereby the first interval (1) may be designated as "record interval," the second interval (2) may be designated as "pause interval," and the third interval (3) will be designated as "erase interval."

It should be noted that the (2,7)RLL signal includes, in addition to the foregoing 1.5 $\tau$ signal and the $4\tau$ signal, a $2\tau$ signal, a $2.5\tau$ signal, a $3\tau$ signal and a $3.5\tau$ signal as is well known in the art, wherein the $2\tau$ signal includes three logic bits "0," the $2.5\tau$ signal includes four logic bits "0," the $3\tau$ signal includes five logic bits "0," and the $3.5\tau$ signal includes six logic bits "0," respectively between the two adjacent logic bits "1." Thereby, each of these signals includes, except for the $1.5\tau$ signal, the write interval having an interval of 60 ns, the pause interval having an interval of 60 ns and the erase interval, wherein the erase interval includes the first and second pulses each having a pulse width of 15 ns and repeated with a period of 30 ns.

Figure 4:
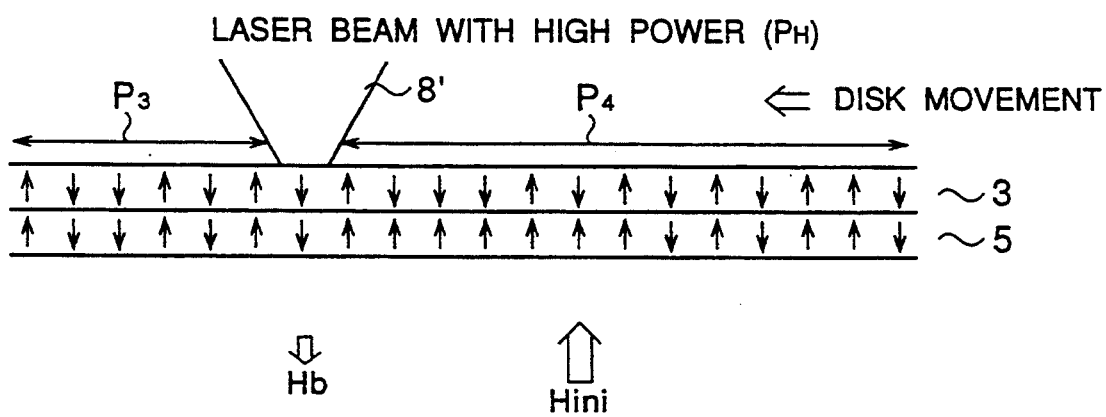
FIG. 4 is a diagram for explaining the conventional writing process.
Figure 5:
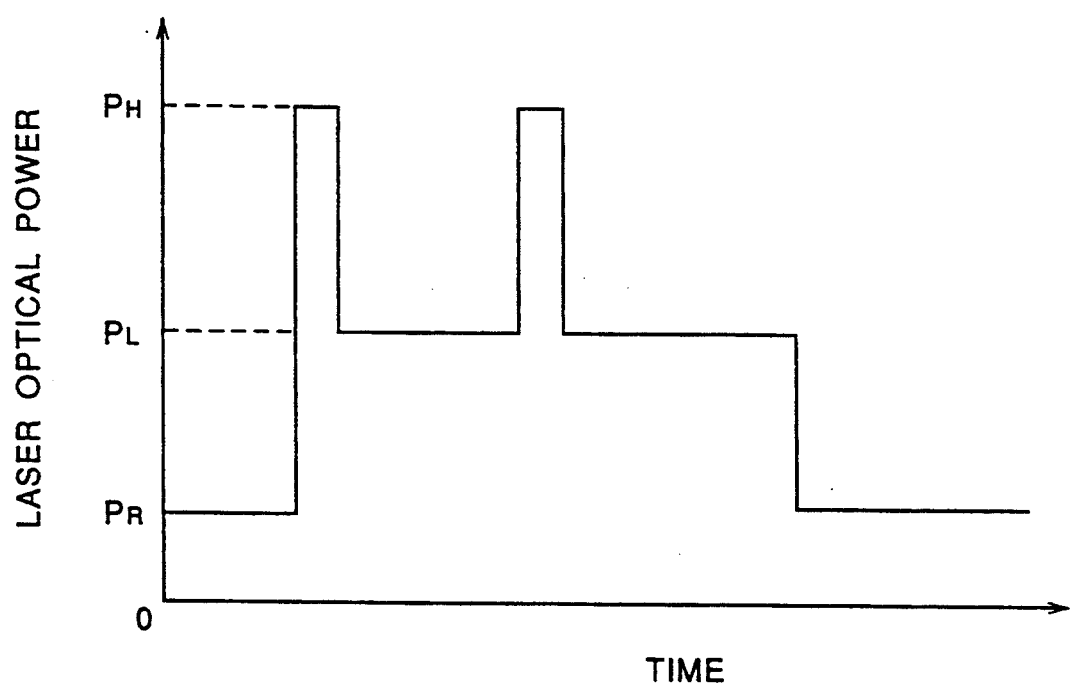
FIG. 5 is a diagram showing an example of the laser pattern used for overwrite recording.

Next, the C/N map obtained according to the process of the present embodiment will be described with reference to FIG. 4, wherein the C/N map shown in FIG. 4 is obtained for the magneto-optical disk 10 revolved at a line velocity of 9 m/sec, by recording the $1.5\tau$ signal shown in FIG. 11(A) continuously after erasing the previously written information and further by overwriting the $1.5\tau$ signal by the $4\tau$ signal shown in FIG. 11(B). The iso-C/N contour obtained according to the foregoing process is designated in FIG. 12 by a broken line designated as V-1 and V-2.

Figure 12:
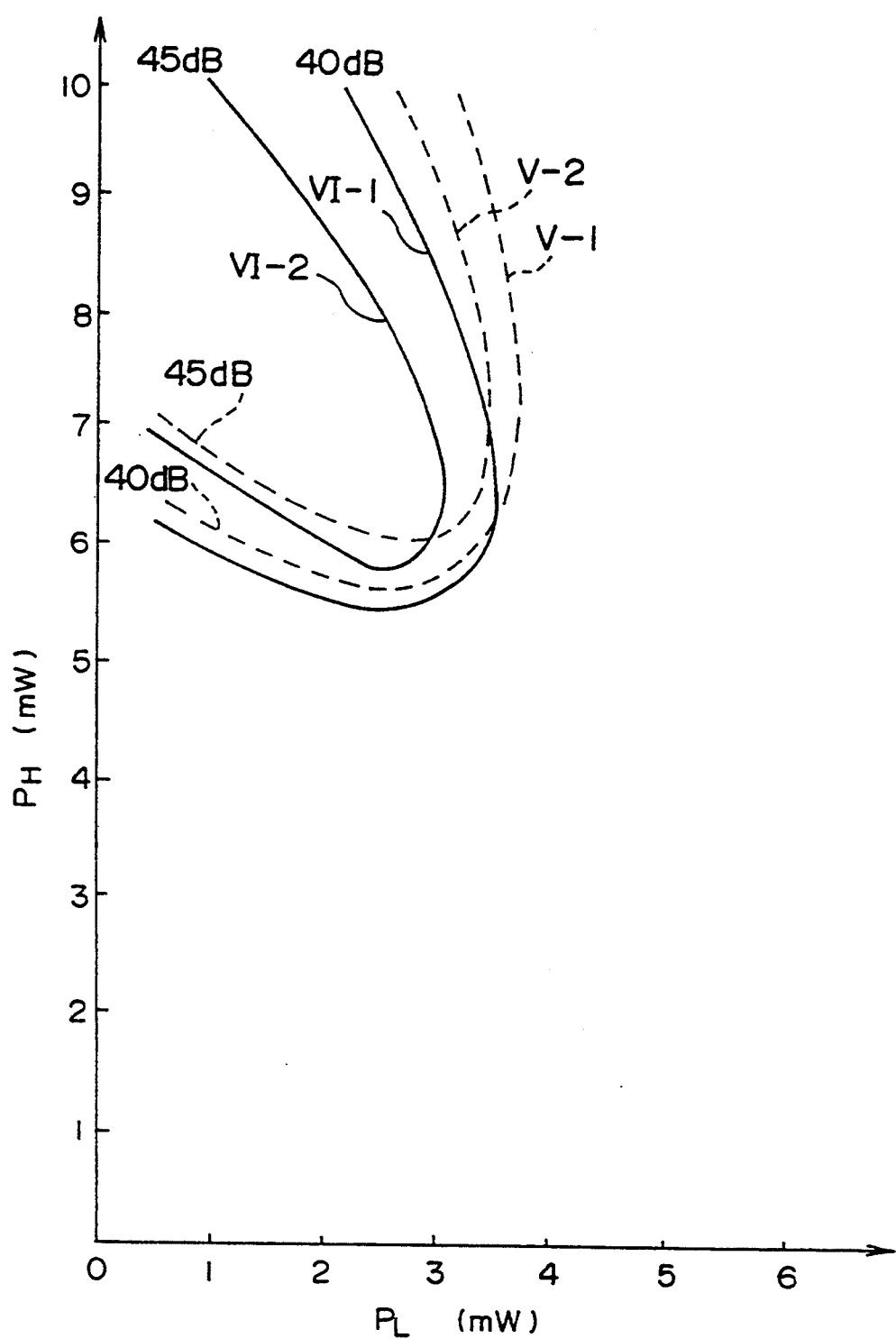
FIG. 12 is a diagram showing the C/N map according to a first embodiment of the present invention.

Further, the continuous lines VI-1 and VI-2 in FIG. 12 shows a C/N map that is obtained by recording the $4\tau$ signal of FIG. 4(B) continuously after erasing the magneto-optical disk 10 and further by overwriting the $4\tau$ signal with the $1.5\tau$ signal shown in FIG. 11(A). In FIG. 12, the broken line V-1 and the continuous line VI-1 represent the C/N map for the iso-C/N contour of 40 dB, while the foregoing broken line V-2 and the continuous line VI-2 represent the iso-C/N contour of 45 dB.

As can be seen clearly in FIG. 12, one can obtain the practical C/N ratio of 45 dB by setting the optical power $P_H$ to 7-8 mW and the optical power $P_L$ to about 2 mW. By setting the optical powers $P_H$ and $P_L$ as such, the peak of the C/N ratio represented by the broken line V-2 agrees substantially with the peak of the C/N ratio represented by the continuous line VI-2. Thus, the present embodiment guarantees the optimum C/N ratio of more than 45 dB, even when significantly different recording patterns are recorded, by switching the optical power of the laser diode between the optical power levels $P_H$ and $P_L$ and without modifying the value of the optical power levels $P_H$ and $P_L$ of the laser diode.

Figure 7:
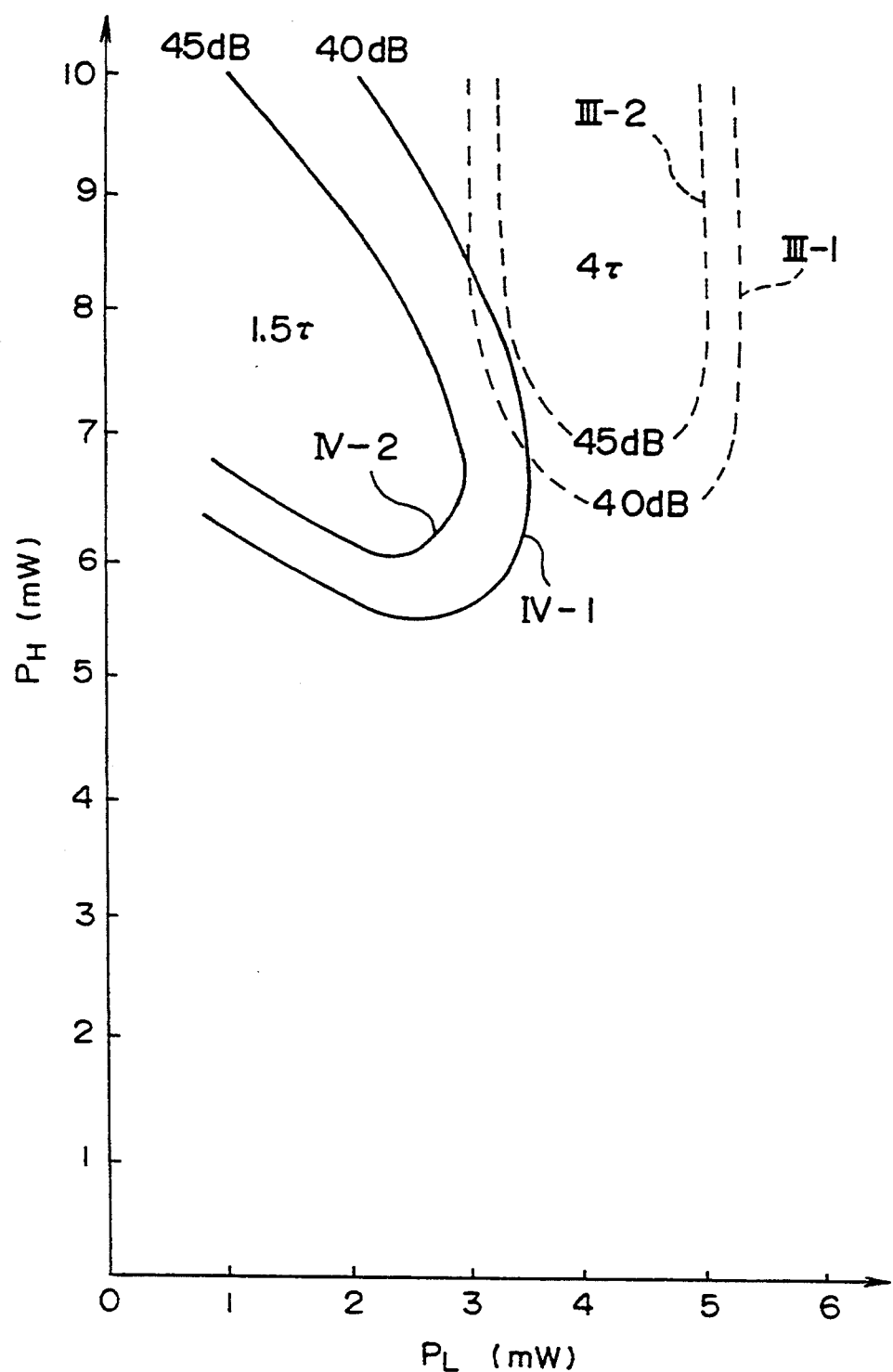
FIG. 7 is a diagram showing the C/N map according to a conventional recording process.
Figure 8A:
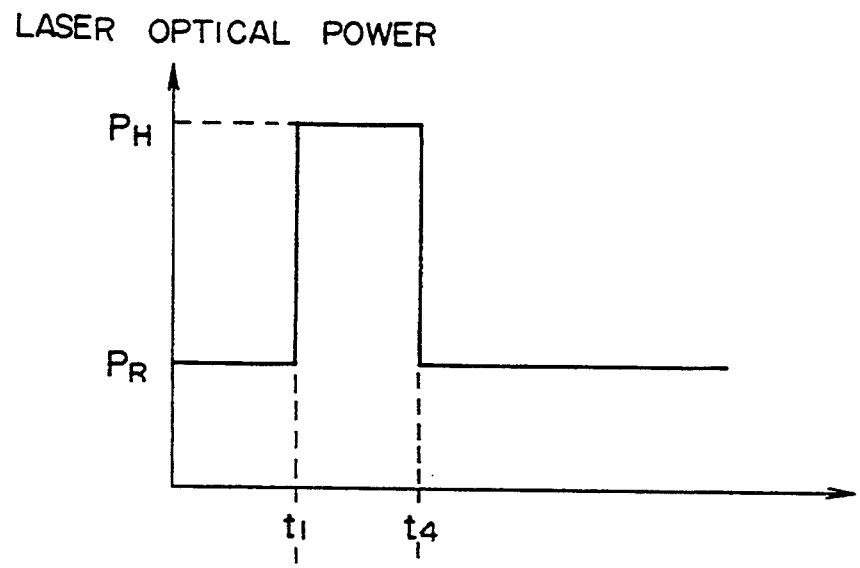
FIGS. 8(A) and 8(B) are diagrams showing the relationship between the laser power and the temperature distribution on the recording medium.
Figure 8B:
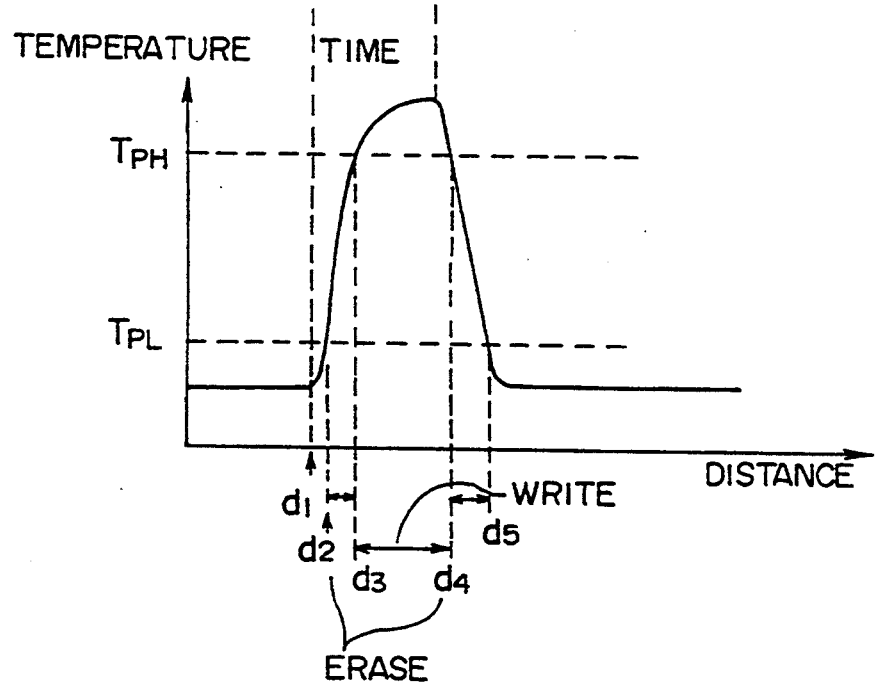

As shown in FIG. 12 by the lines V-1 and V-2, it will be noted that one can use a small optical power level for the optical power $P_L$ when overwriting the $1.5\tau$ signal by the $4\tau$ signal, as compared with the conventional case represented by the lines III-1 and III-2 in FIG. 7. The reason of this very desirable result is attributed to the fact that one can hold the temperature of the magneto-optical disk 10 above the erase temperature but below the write temperature during the interval (3) of FIG. 11(B).

Figure 6:
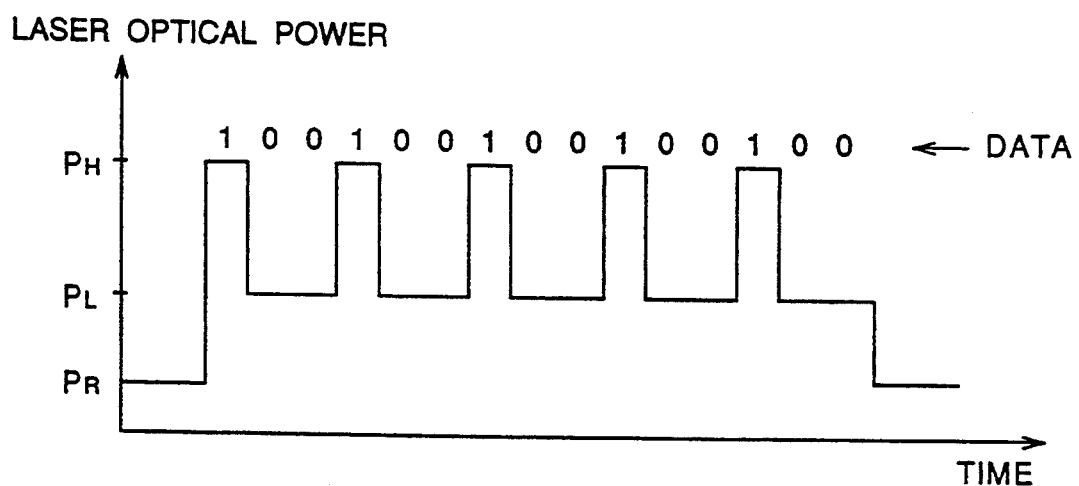
FIGS. 6(A) and 6(B) are diagrams showing conventional laser patterns for writing a $1.5\tau$ signal and a $4\tau$ signal respectively.
Figure 6:
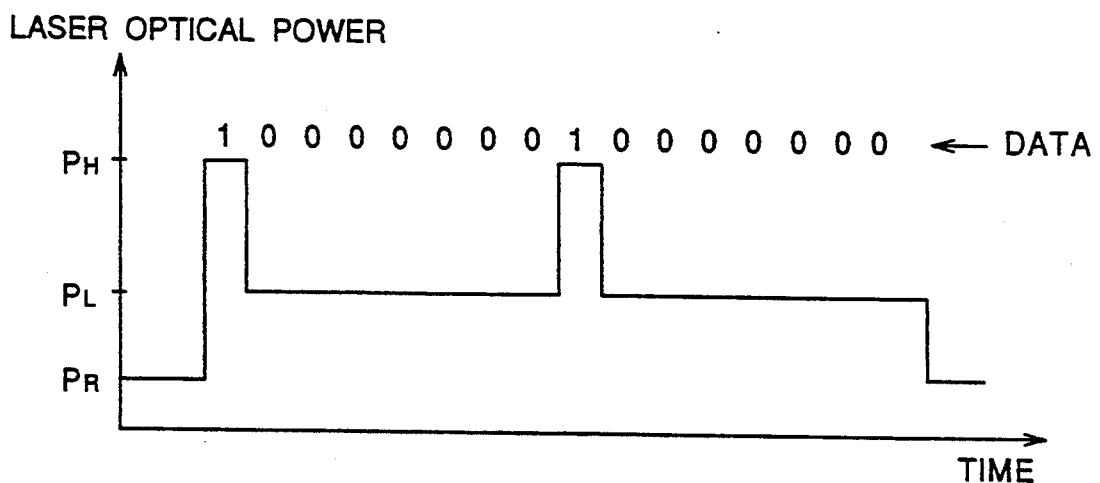

It should be noted that the characteristics indicated by the continuous line VI-1 and VI-2 of FIG. 12 for overwriting the $4\tau$ signal by the $1.5\tau$ signal are substantially identical with the corresponding conventional characteristics represented by the lines IV-1 and IV-2 of FIG. 7, particularly with respect to the optical power $P_L$, as the recorded the pattern for the $1.5\tau$ signal shown in FIG. 11(A) is identical with the signal shown in FIG. 6(A).

Meanwhile, the applicant of the present invention has previously proposed a recording method in the Japanese Laid-open Patent Publication 1-119941, wherein an erasing optical beam is radiated upon a magneto-optical disk in correspondence to the portion thereof wherein no recording mark should be formed. Thereby, the erasing optical beam is formed as an alternate repetition of narrow optical pulses having a pulse width smaller than the optical pulse that is used for forming the recording mark. According to this conventional process, the recording signal has a waveform shown in FIG. 13(A) where there is a train of repetitive pulses in correspondence to the interval (5) except for the interval (4) wherein the formation of the recording mark is to be made. In this regard, the process of the foregoing prior art is somewhat similar to the process of the present invention that also uses an erasing pulse train in correspondence to the interval (3) of FIG. 11(B). However, it should be noted that the foregoing prior art does not utilize the interlayer exchange coupling for recording information. It uses the anti-magnetism for the same purpose. Because of this, erasing is achieved in the foregoing prior art in correspondence to the logic value "0" by using the pulse train as indicated in the interval (5) of FIG. 13(A).

Figure 13:
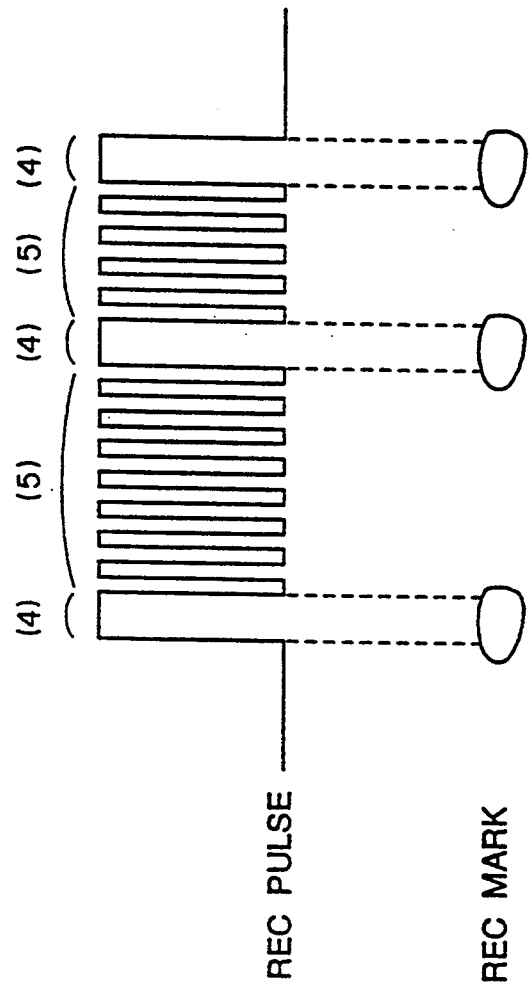
FIGS. 13(A) and 13(B) are diagrams showing the relationship between a recording pulse and a recording mark formed on a recording medium according to a recording process proposed previously.

When the foregoing conventional process is employed in the present embodiment that uses the layered, exchange-coupled recording medium, there arises a problem in that an excessively elongated recording mark tends to be formed in correspondence to the bit "1" as shown in FIG. 13(B), because of the excessive temperature elevation of the magneto-optical disk as a result of the erase pulses radiated in correspondence to the bit "0."

In the pit-edge recording process wherein reading of data "1" is achieved based upon the position of pit edge of the recording mark on the recording medium, such a formation of the excessively elongated recording mark may cause a detrimental error. The present invention successfully eliminates such a problem of erroneous recognition of data, by providing a pause interval (2) immediately adjacent to the bit "1." Thereby, one can record the pit edge without deviation.

Figure 14:
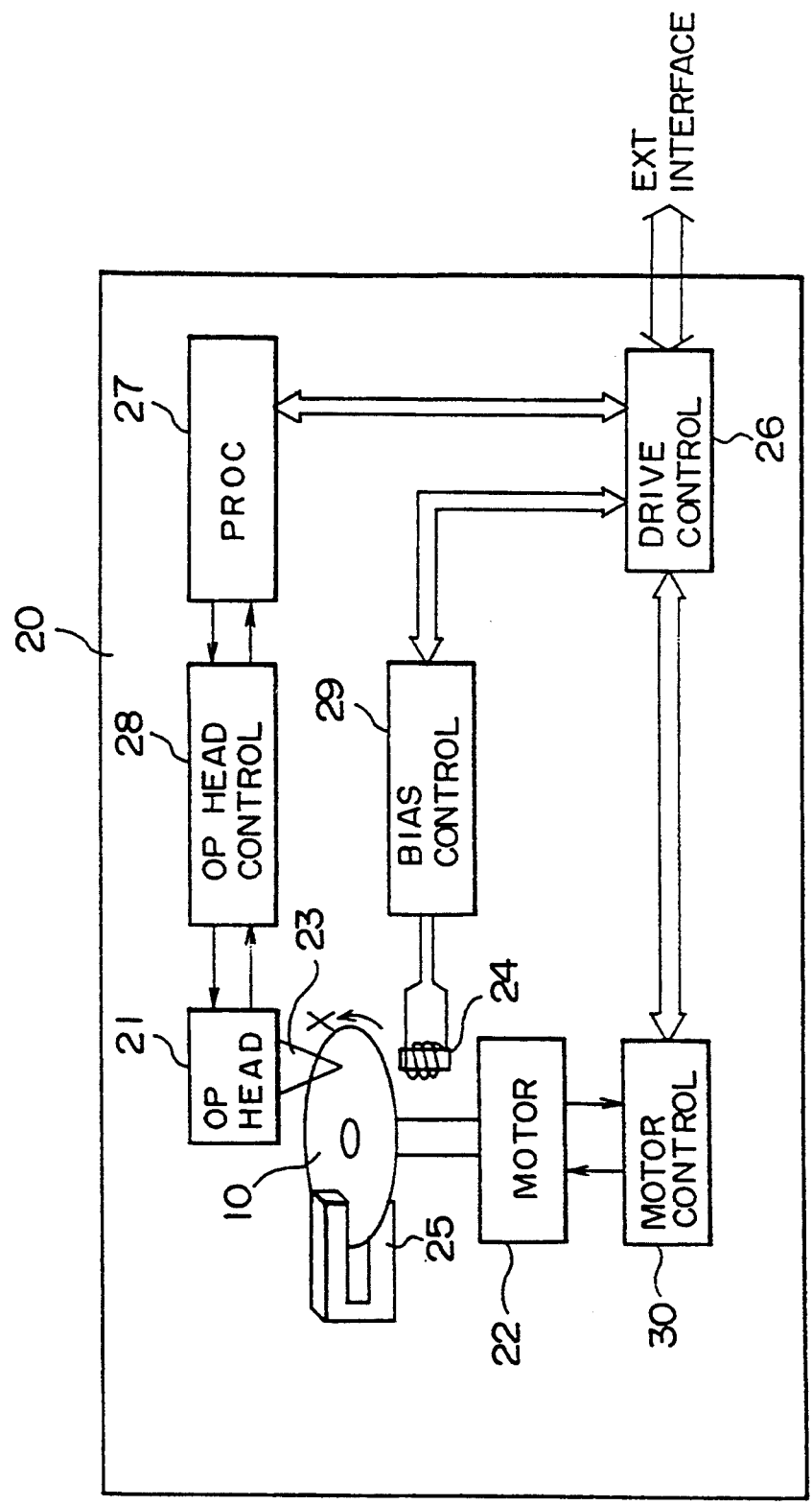
FIG. 14 is a diagram showing the construction of a recording apparatus according to the first embodiment of the present invention.

Next, an embodiment of the recording apparatus of the present invention will be described with reference to FIG. 14 that shows the construction of such an apparatus 20. The apparatus 20 shown in FIG. 14 includes both the recording system and reproducing system and hence forms a recording/reproducing apparatus. The recording/reproducing apparatus 20 includes an optical head 21 for recording and/or reproducing information on and from the magneto-optical disk 10.

The magneto-optical disk 10 is revolved by a spindle motor 22 in the direction designated by an arrow X. The magneto-optical disk 10 is irradiated by a laser beam 23 produced by the optical head 23, wherein the magneto-optical disk 10 is applied with a bias magnetic field $H_b$ created by a bias magnet 24, in correspondence to the part that is illuminated by the laser beam 23. Further, the magneto-optical disk 10 is applied with an initializing magnetic field $H_{ini}$ by an initializing magnet 25, wherein the magnetic field $H_{ini}$ is applied to a part of the disk 10 offset from the part where the bias magnetic field $H_b$ is applied.

Further, there is provided a drive controller 26 for controlling the overall operation of the recording/reproducing apparatus 20, wherein the controller 26 is connected to an external apparatus such as computer via a standard I/O interface that may be designed in compliance to the SCCI specification. In connection to the controller 26, there is provided a signal processing circuit 27 that is supplied with the recording data for converting the same to the foregoing (2,7)RLL format for recording on the disk 10. When reproducing, the circuit 27 converts back the reproduced (2,7)RLL signal to the original format to recover the reproduced signal. The (2,7)RLL signal produced by the signal processing circuit 27 is supplied to an optical head control circuit 28 that produces the recording pulses when recording information on the magneto-optical disk 10. When reproducing, the circuit 28 achieves various processing such as AGC (automatic gain control) and equalization, to recover the reproduced pulses in response to the reproduced signal reproduced by the optical head 21.

The optical head 21 produces, when recording on the disk 10, an amplitude modulated laser beam in response to the recording pulses supplied from the control circuit 28, and irradiates the magneto-optical disk 10 by the amplitude modulated laser beam thus produced. When reproducing, on the other hand, the optical head 21 sets the optical power of the laser beam to the foregoing level $P_R$ and directs the laser beam thus produced to the magneto-optical disk 10. Further, while irradiating the disk 10 by the laser beam, the optical head 21 detects the laser beam reflected back from the magneto-optical disk 10 and recovers the reproduced signal in response to the change in the intensity of the detected laser beam or in response to the change of rotation of the polarization plane of the reflected optical beam.

In addition, the apparatus 20 includes a bias magnet control circuit 29 that controls the bias magnet 24 to produce the desired bias magnetic field $H_b$. Further, there is provided a motor control circuit 30 for controlling the revolution of the spindle motor 22 under control of the drive controller 26.

The general construction of FIG. 14 itself is already known in the art, while it should be noted that the apparatus for use in the first embodiment of the present invention is characterized by the point that it includes a pulse generator to be described with reference to FIG. 15 in the optical head control circuit 28 and that the optical head 21 includes therein a laser diode and a drive circuit thereof as will be described later with reference to FIG. 17.

Figure 15:
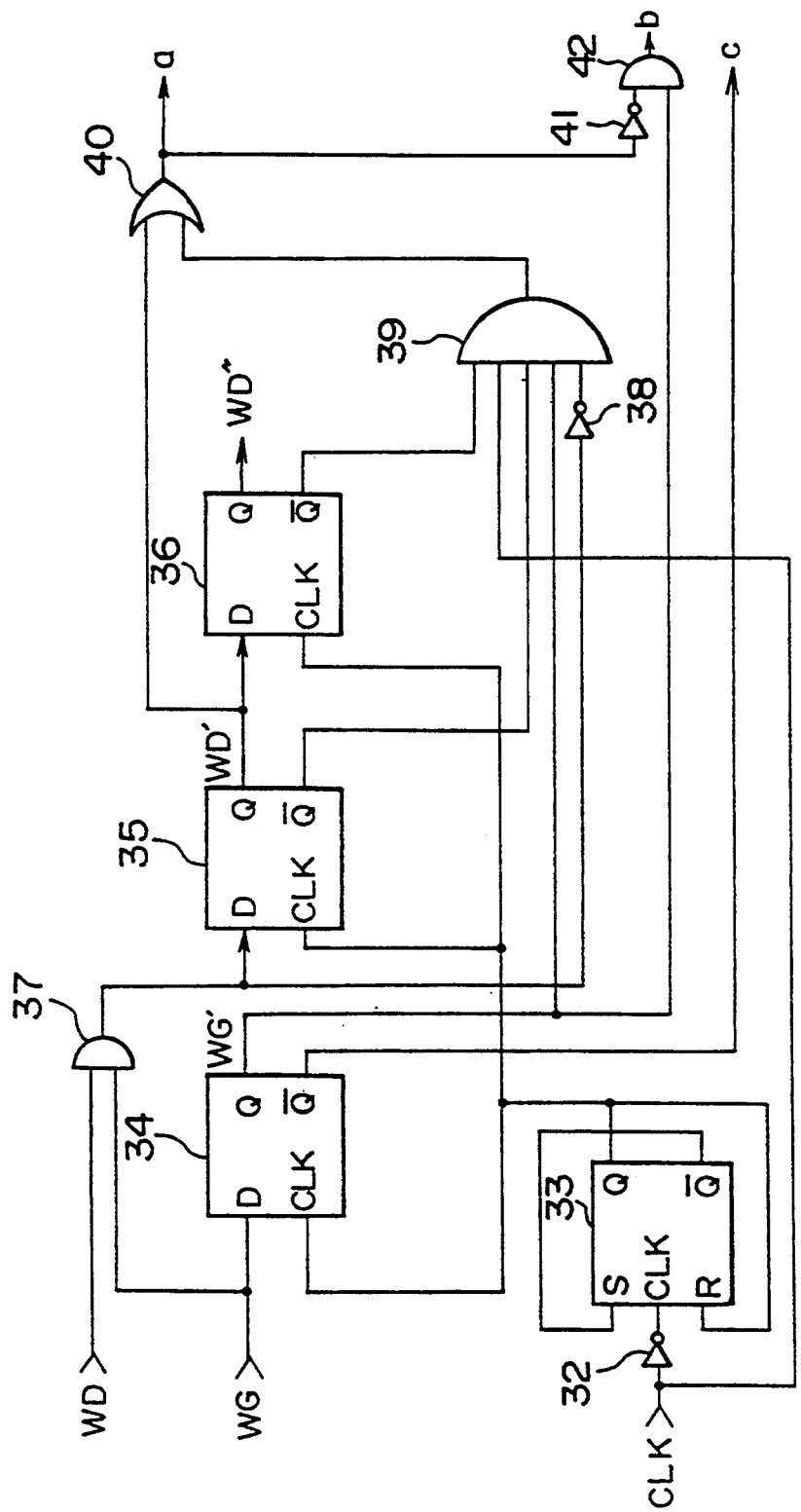
FIG. 15 is a circuit diagram showing the essential part of the apparatus of the present invention.
Figure 16:
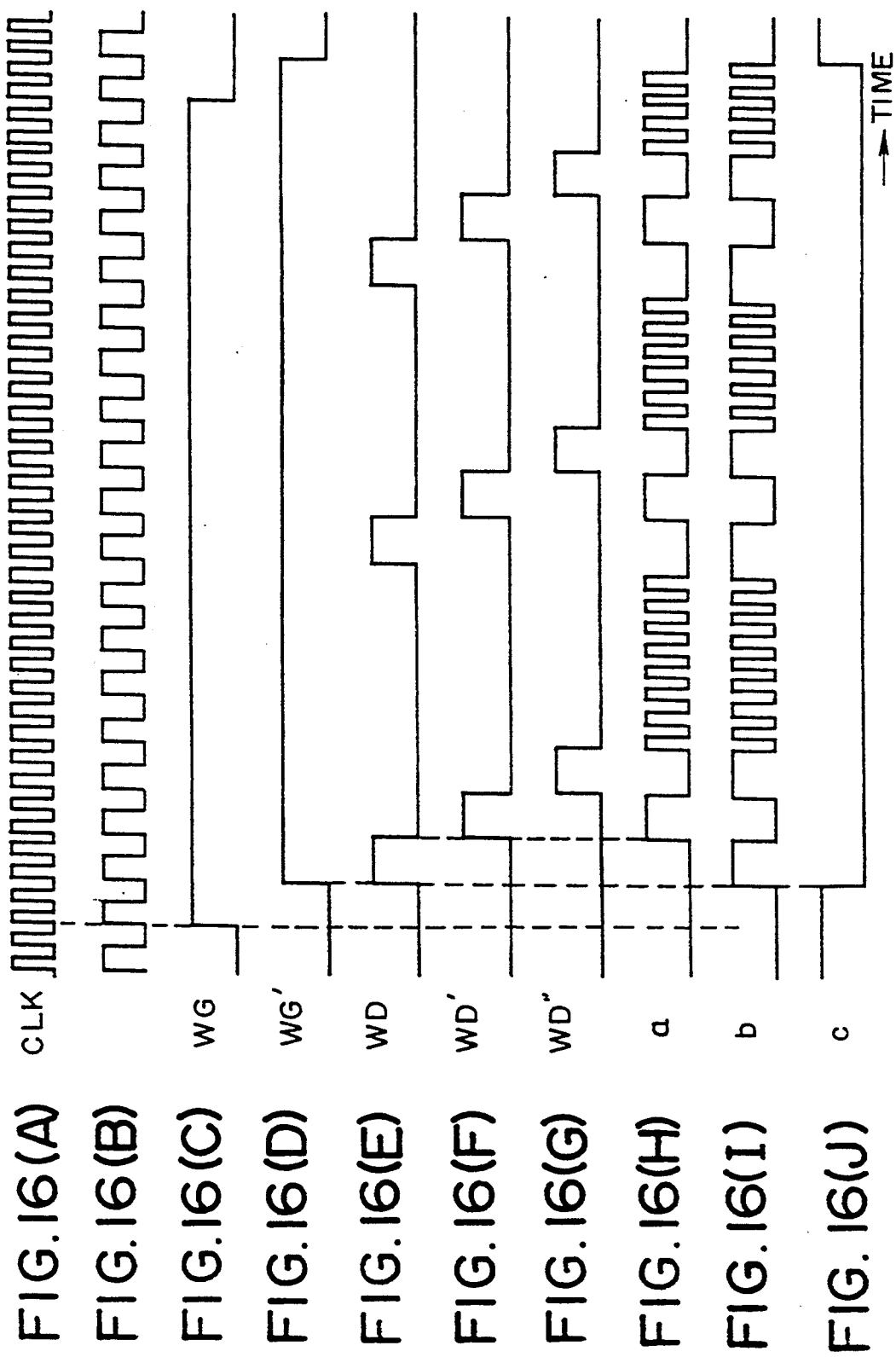
FIGS. 16(A)–16(J) are time charts for explaining the operation of the circuit of FIG. 5.

Referring to FIG. 15 showing the pulse generator mentioned above, there is provided an RS flip-flop 33 that has a clock terminal for receiving a clock pulse CLK shown in FIG. 16(A), via an inverter 32. The clock pulse CLK has a symmetric pulse shape, and has a pulse width of 15 ns and a period of repetition of 30 ns. The RS flip-flop 33 thereby divides the frequency of the clock pulse CLK by one-half to produce a clock pulse shown in FIG. 16(B) wherein the clock pulse of FIG. 16(B) has a pulse width of 30 ns and a period of repetition of 60 ns. The clock pulse thus produced is supplied to the clock terminals of the D-type flip-flops 34, 35 and 36.

FIG. 16(E) shows the recording pulse that is to be recorded on the magneto-optical disk 10. Referring to FIG. 16(E), the recording pulse assumes a high level state in response to the logic level "1" of the recording data and has a pulse width of 60 ns. It should be noted that the recording pulse of FIG. 16(E) is supplied to the data input terminal of the D-type flip-flop 35 via an AND circuit 37 of FIG. 15 during the high level state of the write gate signal WG shown in FIG. 16(C). Simultaneously, the recording pulse of FIG. 16(E) is supplied to an AND circuit 39 of FIG. 15 via an inverter 38.

The D-type flip-flop 34 latches the foregoing write gate signal WG in response to the frequency-divided clock of FIG. 16(B) and produces a write gate signal WG' shown in FIG. 16(D) with a delay of 60 ns. The D-type flip-flop 35, on the other hand, delays the output of the foregoing AND circuit 37 with a delay of 60 ns and produces data WD' shown in FIG. 16(F). Further, the D-type flip-flop 36 delays the data WD' further by another 60 ns to produce data WD" as shown in FIG. 16(G).

The AND circuit 39 is supplied with output signals XWG', XWD' and XWD" respectively corresponding to the logic inversion of the output signals WG', WD' and WD" produced by the D-type flip-flops 34, 35 and 36, as well as with a logic inversion of the output of the AND circuit 37, and further with the clock CLK of FIG. 16(A) having the period of 30 ns, and produces a high level output only when all the input signals have a high level state. On the other hand, there is provided an OR circuit 40 that is supplied with the output of the AND circuit 39 and the foregoing data WD' to produce an output pulse a shown in FIG. 16(H) in accordance with a logic sum of the supplied input signals.

The pulse a thus obtained is supplied to an AND circuit 42 after logic inversion in an inverter 41, wherein the AND circuit 42 produces an output pulse b shown in FIG. 16(I) in accordance with a logic product of the signal a and the delayed write gate signal WG'. Further, the logic inversion of the delayed write gate signal WG', obtained from the D-type flip-flop 34, is outputted as shown in FIG. 16(J) as a pulse c.

Figure 17:
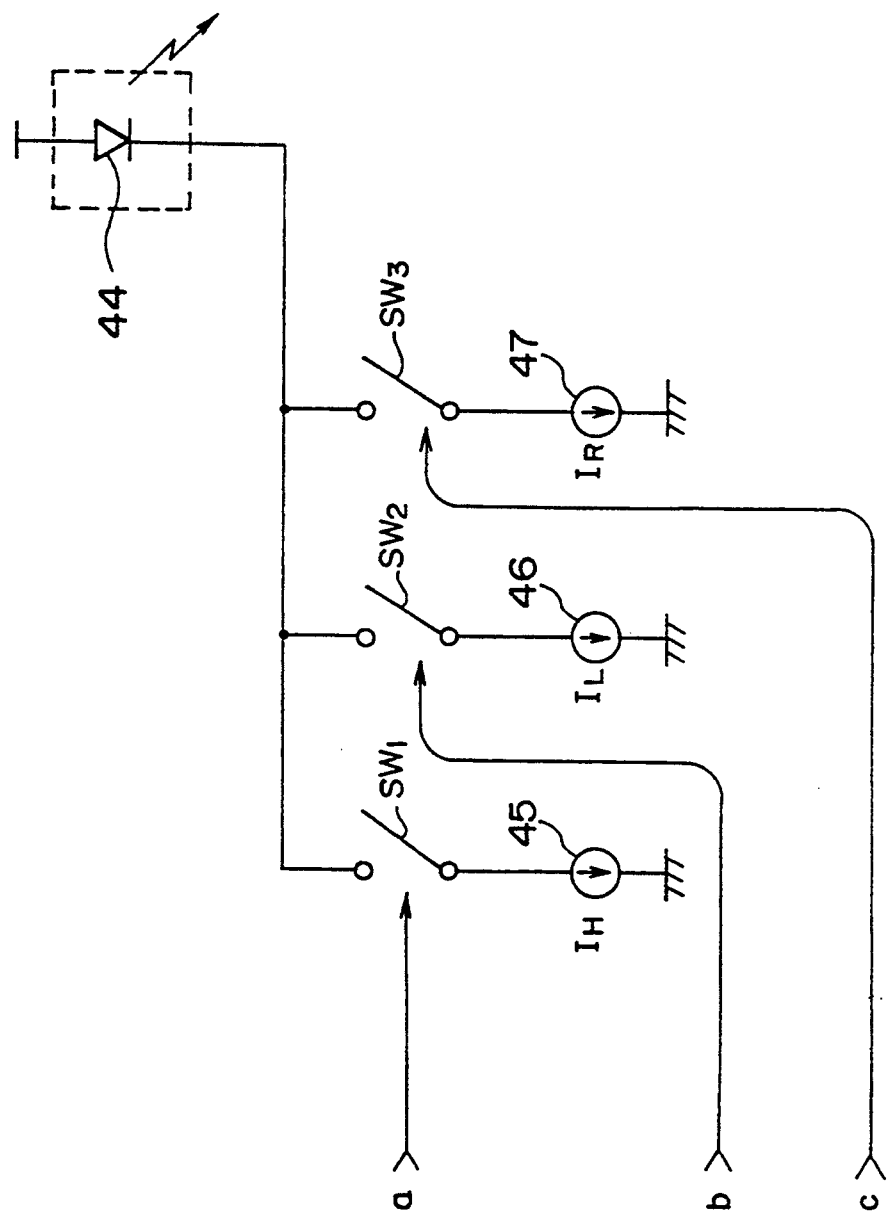
FIG. 17 is a schematical circuit diagram showing another essential part of the apparatus of the present invention.
Figure 18:
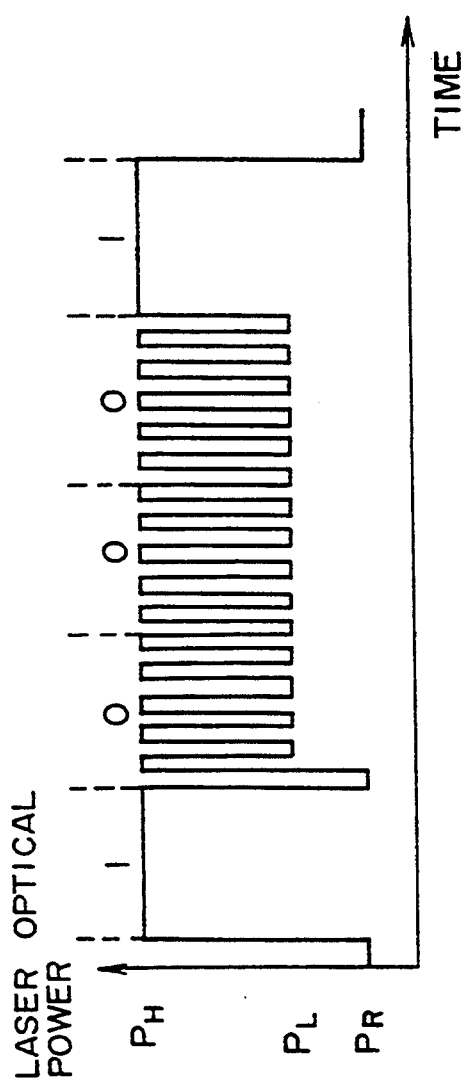
FIG. 18 is a diagram showing the principle of the present invention.

The foregoing pulses a, b and c are supplied to the laser diode control circuit provided in the optical head 21 as a switching pulse as shown in FIG. 17. Referring to FIG. 17, it should be noted that there is provided a laser diode 44 in the optical head 21 for emitting the foregoing laser beam 23, wherein the laser diode 44 has a cathode to which a drive current is supplied selectively from one of constant current sources 45–47. As a result, the optical power of the laser diode is controlled.

It should be noted that the constant current source 45 is connected to the cathode of the laser diode 44 via a switch SW$_1$. Similarly, the constant current sources 46 and 47 are connected respectively to the cathode of the laser diode 44 via switches SW$_2$ and SW$_2$, wherein it should be noted that the each of the switches SW$_1$–SW$_3$ is turned on in response to the high level state of the pulses a, b and c.

As can be seen from FIGS. 16(H) and 16(I), the pulses a and b are in the anti-phase relationship during the low level interval of the pulse c shown in FIG. 16(J), wherein the low level interval of the pulse c represents the recording interval. Thereby, the switch SW$_3$ is turned off continuously during the recording interval while only one of the switches SW$_1$ and SW$_2$ is turned on during the recording interval. When the switch SW$_1$ is turned on, the laser diode 44 is supplied with a drive current I$_H$ from the constant current source 45, and the output optical power of the laser diode 44 is set to the foregoing level P$_H$. On the other hand, when the switch SW$_2$ is turned on, the laser diode 44 is supplied with a drive current I$_L$ (I$_L$<I$_H$) and the output optical power of the laser diode 44 is set to the foregoing level P$_L$.

Thus, it will be noted that the laser diode 44 produces the output laser beam with the optical power changing between the high power level P$_H$ and the low power level P$_L$ in accordance with the signal a during the recording interval of the apparatus. In FIG. 16(H), it should be noted that the high level interval of the signal a provides the high optical power level P$_H$, while the low level interval provides the low power level P$_L$.

When reproducing, only the pulse c is set to the high level state, while the pulses a and b are all set to the low level state. Thereby, only the switch SW$_3$ is turned on and the laser diode 44 is supplied with a drive current I$_R$ (I$_R$<I$_L$), and the laser diode 44 produces the laser beam with the optical power P$_R$.

Next, a second embodiment of the present invention will be described. In the present embodiment, the optical head control circuit 28 of FIG. 14 includes a pulse generator shown in FIG. 17 in the recording system thereof. Further, the optical head 21 is provided with the laser diode 44 and the control circuit thereof shown in FIG. 10.

Figure 19:
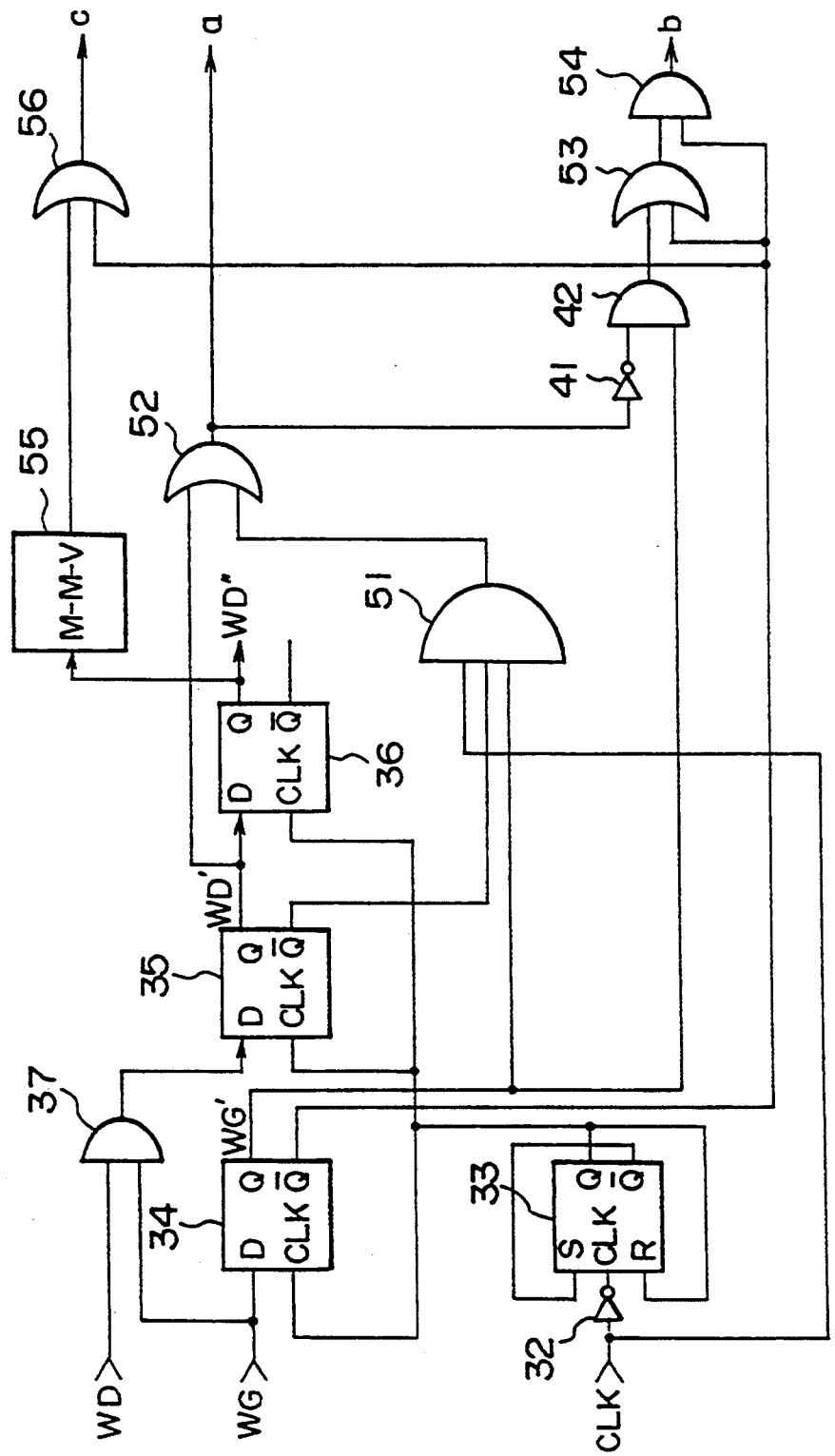
FIG. 19 is a circuit diagram showing the essential part of the apparatus according to a second embodiment of the present invention.
Figure 20:
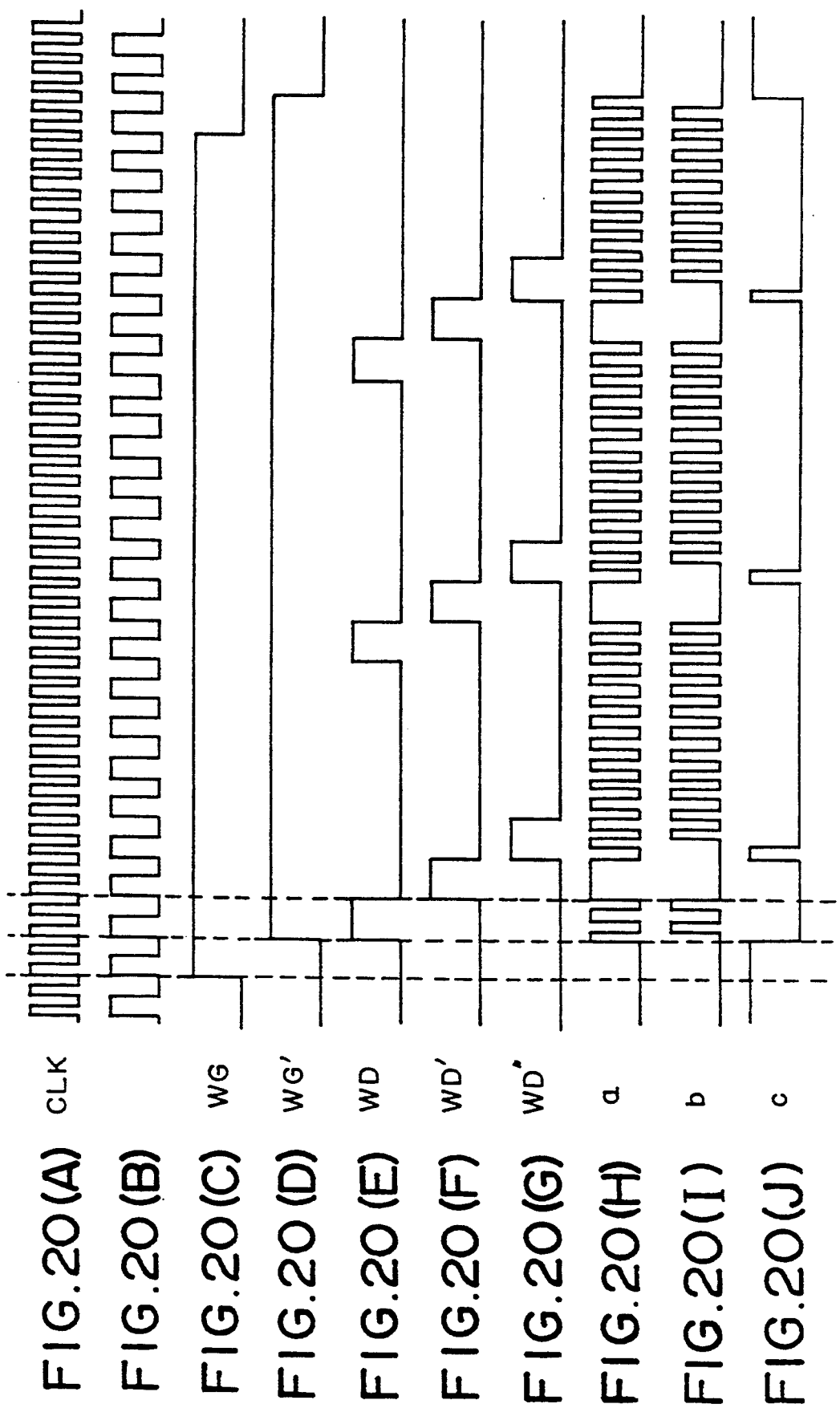
FIGS. 20(A)–20(J) are time charts for explaining the operation of the circuit of FIG. 19.

Referring to FIG. 19, those parts configured identically with the parts shown in FIG. 15 are designated by the same reference numerals. Referring to FIG. 19, it will be seen that a clock pulse CLK, of which waveform is shown in FIG. 20(A), is supplied to the clock terminal of the RS flip-flop 33 via the inverter 32. As can be seen in FIG. 20(A), the clock pulse CLK is a symmetric rectangular wave. The RS flip-flop 33 thereby frequency-divides the clock pulse CLK and produces a second clock pulse shown in FIG. 20(B). The second clock pulse thus produced is supplied to the clock terminals of the D-type flip-flops 34, 35 and 36.

On the other hand, FIG. 20(E) shows the recording pulse. Similarly to before, the recording pulse has a period of repetition twice as large as the frequency of the clock pulse CLK and assumes a high level state in response to the logic value "1." The recording pulse is supplied to the data input terminal of a D-type flip-flop 35 via the AND circuit 37 during the high level interval of a write gate signal WG of which waveform is shown in FIG. 20(C).

The D-type flip-flop 34 produces a write gate signal WG' shown in FIG. 20(D) by dividing the frequency of the foregoing signal WG by one-half and latching the same. On the other hand, the D-type flip-flop 35 delays the output of the foregoing AND circuit 37 to produce an output data WD' shown in FIG. 12(F). The D-type flip-flop 36 delays the data WD' further to produce output data WD'' shown in FIG. 20(G).

The circuit of FIG. 19 includes an AND circuit 50 that is supplied with signals XWG' and XWD' that are logic inversions of the output signals WG' and WD' produced by the D-type flip-flops 34 and 35 and further with the clock CLK of FIG. 20(A). Thereby, the AND circuit 50 produces a high level output only when all the input signals have the high level state. Further, there is provided an OR circuit 51 that is supplied with the output of the AND circuit 50 and the foregoing date WD'. Thereby, the OR circuit 51 produces an output pulse a shown in FIG. 20(H) as a logic sum of the input signals.

The output pulse a thus produced is supplied to the AND circuit 42 after logic inversion in the inverter 41, wherein the AND circuit 42 produces an output as a result of the logic product of the logic inversion of the output pulse a and the delayed write gate signal WG' mentioned previously. The output of the AND circuit 42 is supplied to an OR circuit 53.

The OR circuit 53, on the other hand, produces an output signal as a logic sum of the foregoing AND circuit 42 and the output signal WG' of the D-type flip-flop 34. The output of the OR circuit 53 is supplied to an AND circuit 54, wherein the AND circuit 54 produces an output signal as a logic product of the output of the OR circuit 53 and a signal XWG' that is an anti-phase signal of the output signal WG' of the D-type flip-flop 34. Thereby, an output pulse b shown in FIG. 20(I) is obtained.

The circuit of FIG. 19 further includes a mono-multivibrator 55 that produces an output pulse having a pulse width substantially the same as the pulse width of the clock CLK such that the output pulse rises in response to the detection of the output signal WD'' of the D-type flip-flop 36. The output pulse of the mono-multi-vibrator 53 is supplied to an OR circuit 56, wherein the OR circuit 56 produces an output pulse c shown in FIG. 20(J) as a logic sum of the output of the mono-multi-vibrator 53 and the output signal WG' of the D-type flip-flop 34.

The foregoing pulses a, b and c are supplied to the laser diode control circuit (FIG. 17) provided in the optical head 21 as a switching pulse.

In response to the high level state of the write gate signal WG', the pulse a assumes the high level state for two consecutive periods of the clock CLK, and the switch SW$_1$ is turned on during this interval. Thereby, laser diode 44 is supplied with a drive current I$_H$ from the constant cuurrent source 45 and produces the laser beam with an optical power of P$_H$. In response to this, data "1" is recorded on the magneto-optical disk 10.

Immediately after this, the pulse c is set to the high level state during an interval corresponding to one-quarter the period of the clock CLK, and the switch SW$_3$ is turned on. Thereby, the laser diode 44 is driven with a drive current I$_R$ from the constant current source 47 and the optical power of the laser beam is set to P$_R$.

Next, the pulses a and b are set to the high level state alternately in each one-quarter period of the clock CLK, and the switches SW$_1$ and SW$_2$ are turned on alternately in response thereto. Thereby, the laser diode 44 is supplied with the drive currents I$_H$ and I$_L$ from the constant current sources 45 and 46 alternately, and the output power of the laser diode is changed alternately between the level $P_H$ and $P_L$. As a result, the data "0" is recorded.

In the foregoing construction, therefore, it will be noted that the laser beam having the optical power of $P_H$ is produced only intermittently during the interval corresponding to the logic value "0" of the recording pulse, and the temperature rise of the magneto-optical disk above the erase temperature is avoided. On the other hand, such an intermittent radiation avoids the cooling of the magneto-optical disk 10 and the temperature of the disk 10 is maintained generally in the vicinity of the erase temperature even when the recording marks are recorded on the magneto-optical disk with an increased separation.

Further, the bit "0" that follows immediately behind the bit "1" is recorded such that the optical power of the laser diode 44 is momentarily reduced to the level $P_R$ and then changed alternately between the power level $P_H$ and $P_L$. Thereby, the temperature of the magneto-optical disk 10 is reduced in correspondence to the optical power level $P_R$ and the excessive temperature rise above the write temperature is avoided even when the interval between two adjacent recording marks is small on the disk 10.

Figure 21:
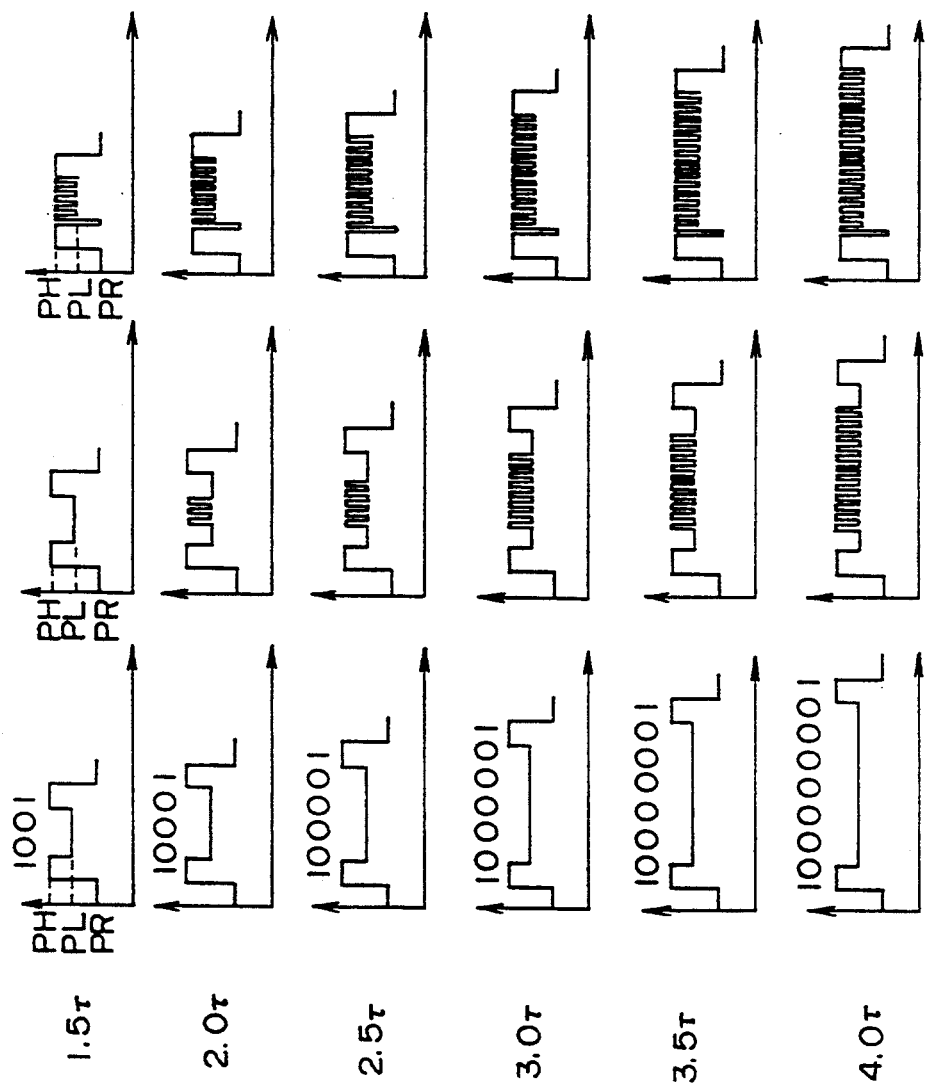
FIGS. 21(A)–21(C) are diagrams showing various laser patterns used in the present invention as well as in the prior art.

FIGS. 21(A)–21(C) compare the conventional recording process, the process of the first embodiment and the process of the second embodiment of the present invention, for each of the $1.5\tau$ signal, $2.0\tau$ signal, $2.5\tau$ signal, $3.0\tau$ signal, $3.5\tau$ signal and $4.0\tau$ signal.

Next, the effect of the present invention will be evaluated with reference to the C/N map. In the C/N map, it should be noted that the area wherein the region that gives a C/N ratio of 45 dB or more for the $1.5\tau$ signal and the region that gives the C/N ratio of 45 dB or more for the $4\tau$ signal overlap each other is called as "low power margin" of the erasing.

Figure 22:
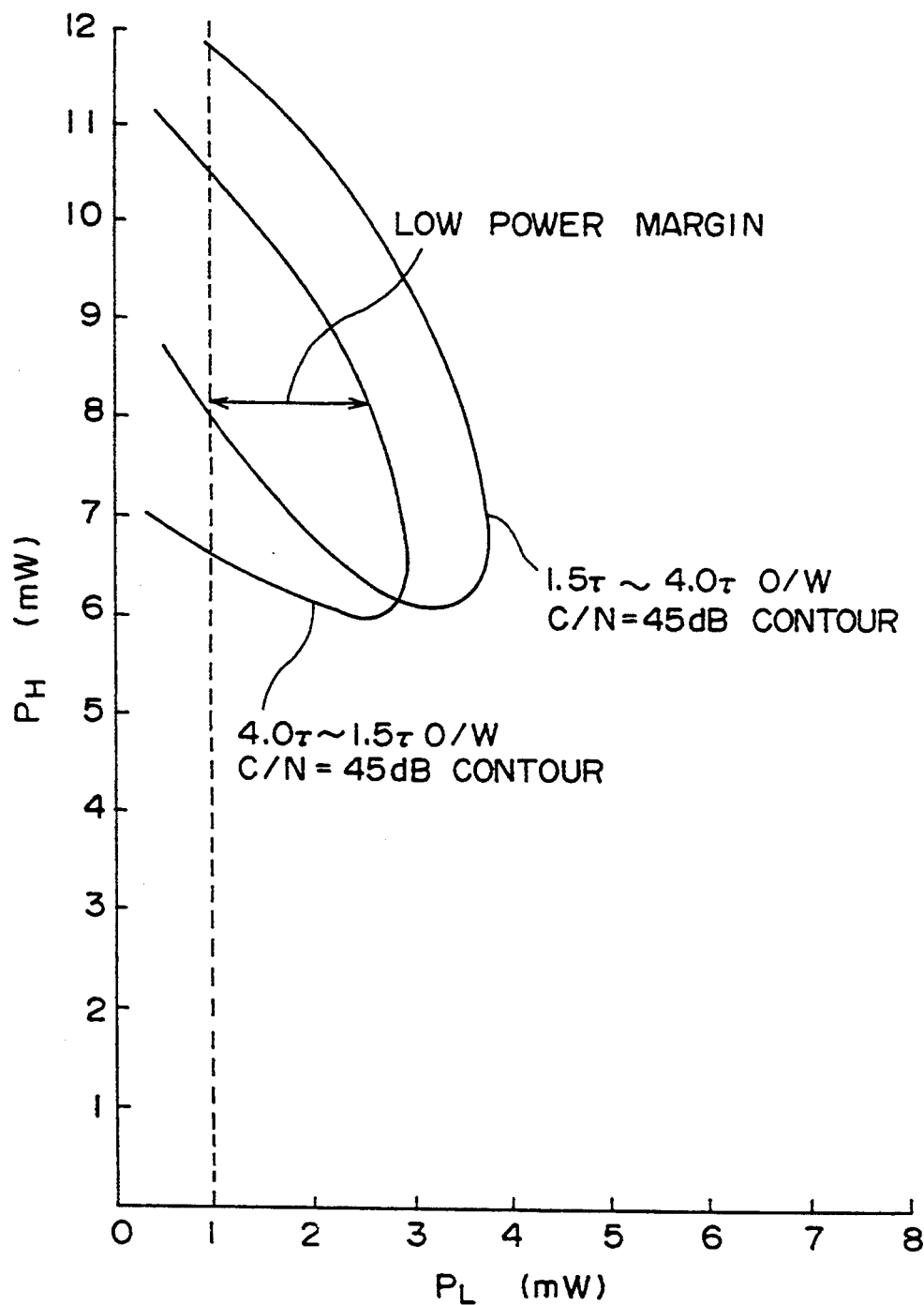
FIG. 22 is a diagram showing the C/N map according to a conventional recording process.
Figure 23:
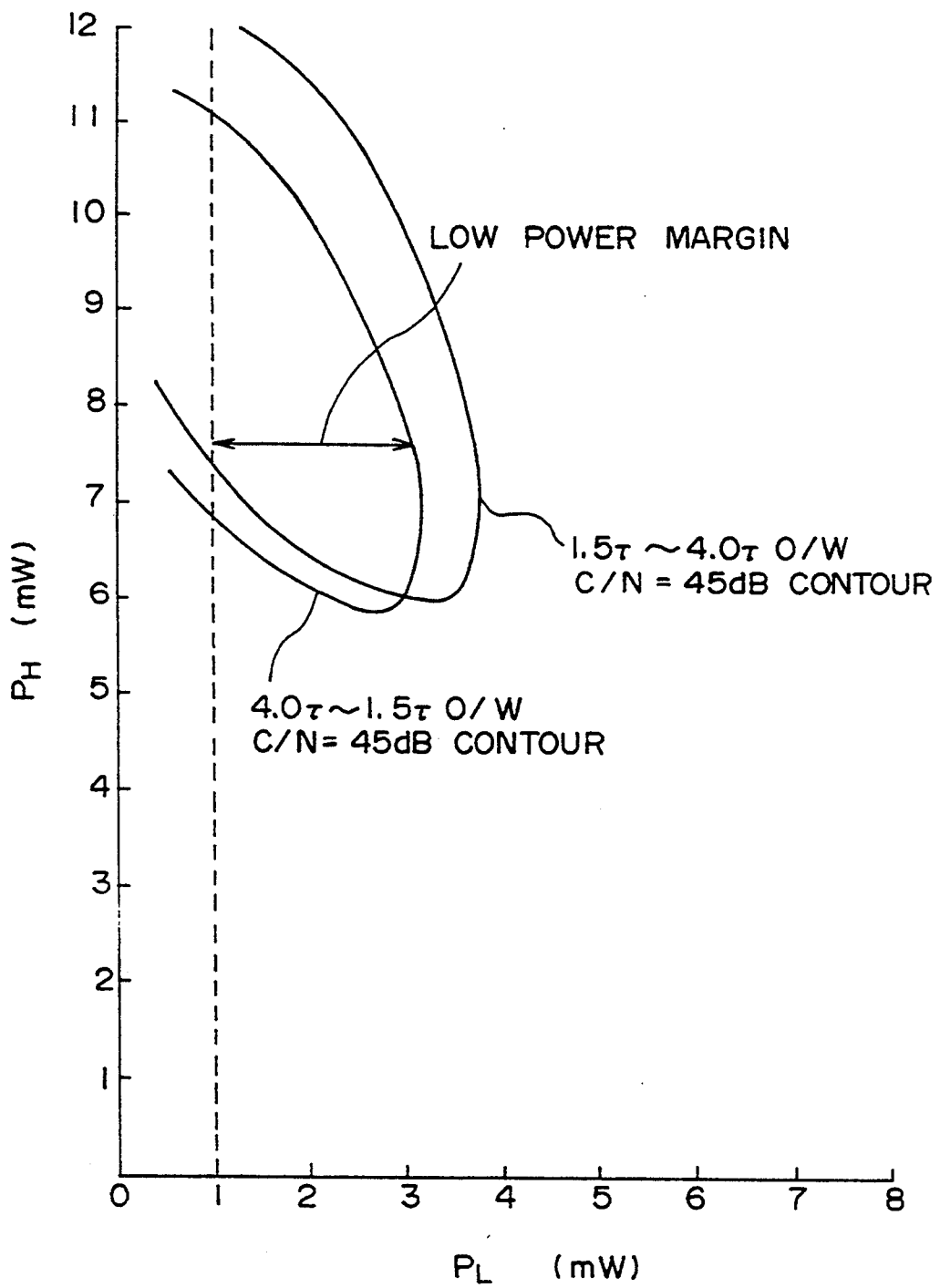
FIG. 23 is a diagram showing the C/N map according to the recording process of the present invention.

When a magneto-optical disk having the cross sectional structure of FIG. 10 is used, the low power margin is 0 mW in the conventional recording process. This low power margin can be expanded up to about 1.5 mW when the recording process proposed by the applicant of the present invention in the aforementioned Japanese Laid-open Patent Publication 1-119941 is employed as indicated in FIG. 22. However, the recording process of the present invention expands this low power margin further to about 1.8 mW in the first embodiment of the present invention. In the second embodiment of the present invention, the low power margin is even expanded more up to the value of about 2.0 mW as indicated in the C/N map of FIG. 23.

On the other hand, when a magneto-optical disk having a structure shown in FIG. 24(A) is employed, the conventional low power margin of about 1.9 mW, which is achieved in the process of the foregoing reference, can be expanded up to about 2.4 mW by using the first and second embodiments of the present invention. It should be noted that the magneto-optical disk of FIG. 24(A) includes a protective layer 61 of Y-SiO$_2$ deposited on a glass substrate 11, a memory layer 62 of $Tb_{20}Fe_{72}Co_8$ deposited on the protective layer 61, a recording layer 63 of $Tb_2Dy_{24}Fe_{44}Co_{30}$ deposited on the memory layer 62, and another protective layer 64 of Y-SiO$_2$ deposited on the recording layer 63. In the structure of FIG. 24(A), no intermediate layer is used.

Figure 25:
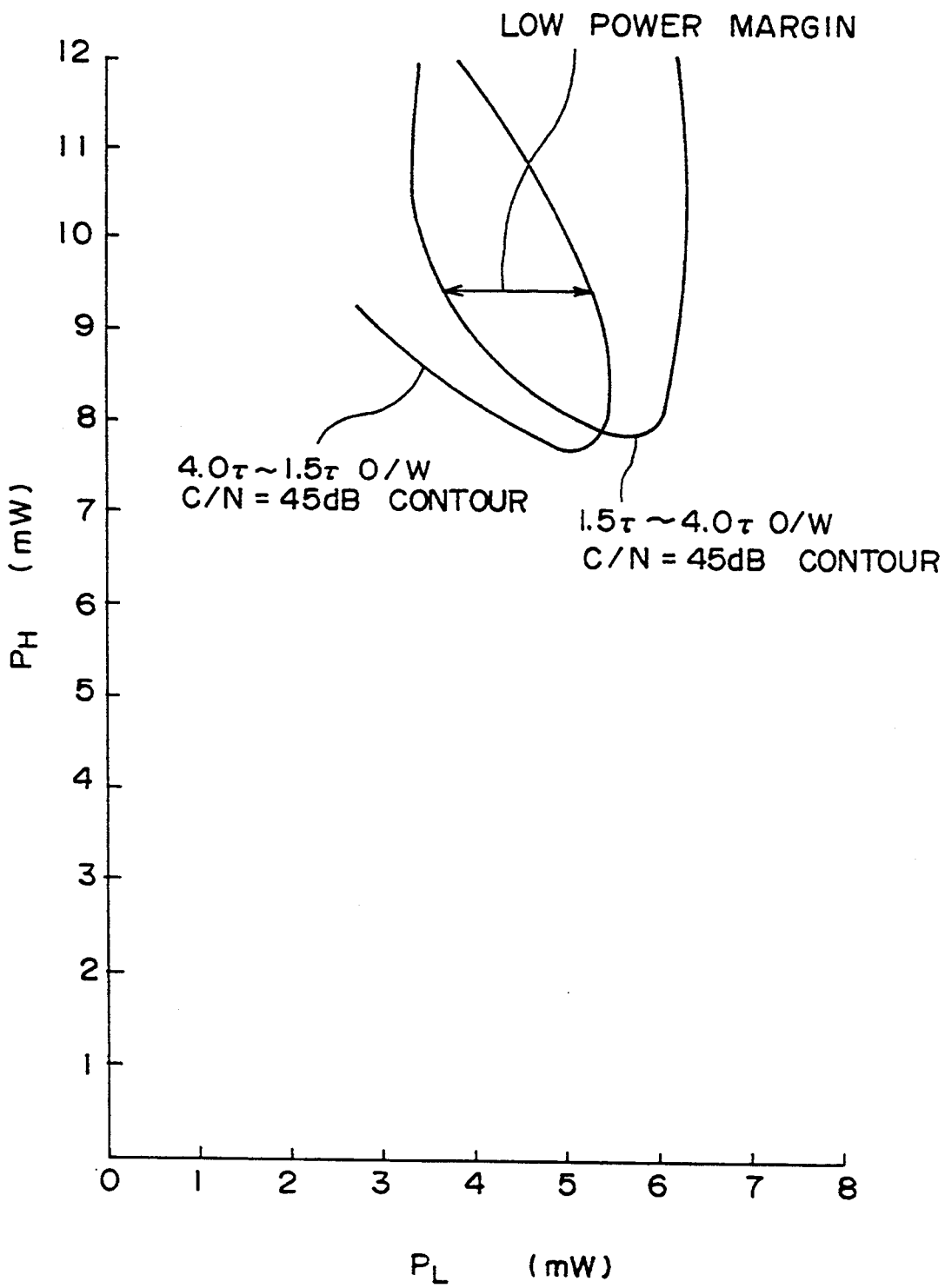
FIG. 25 is a diagram showing a C/N map according to a conventional recording process.
Figure 26:
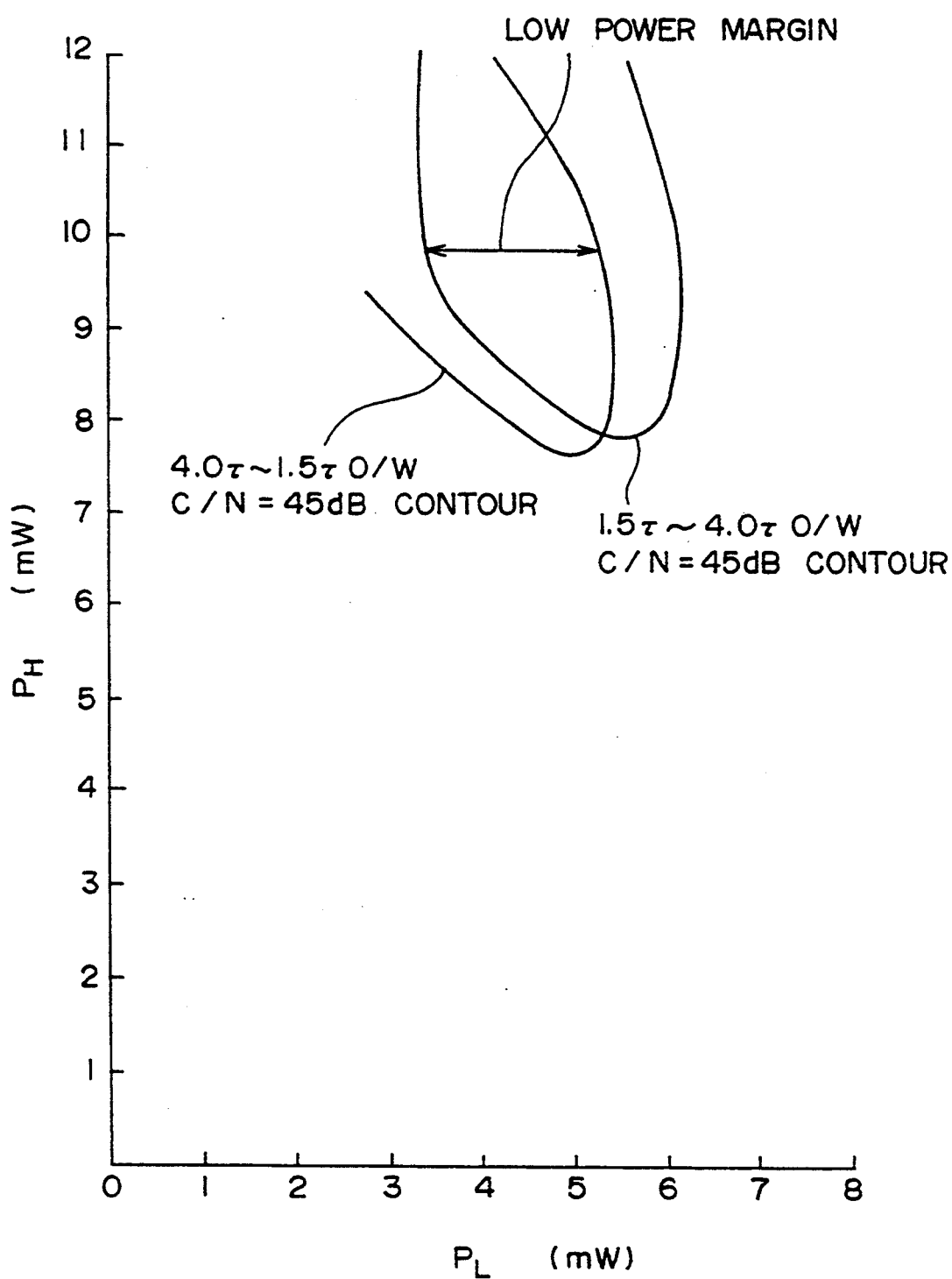
FIG. 26 is a diagram showing a C/N map according to another conventional recording process.
Figure 27:
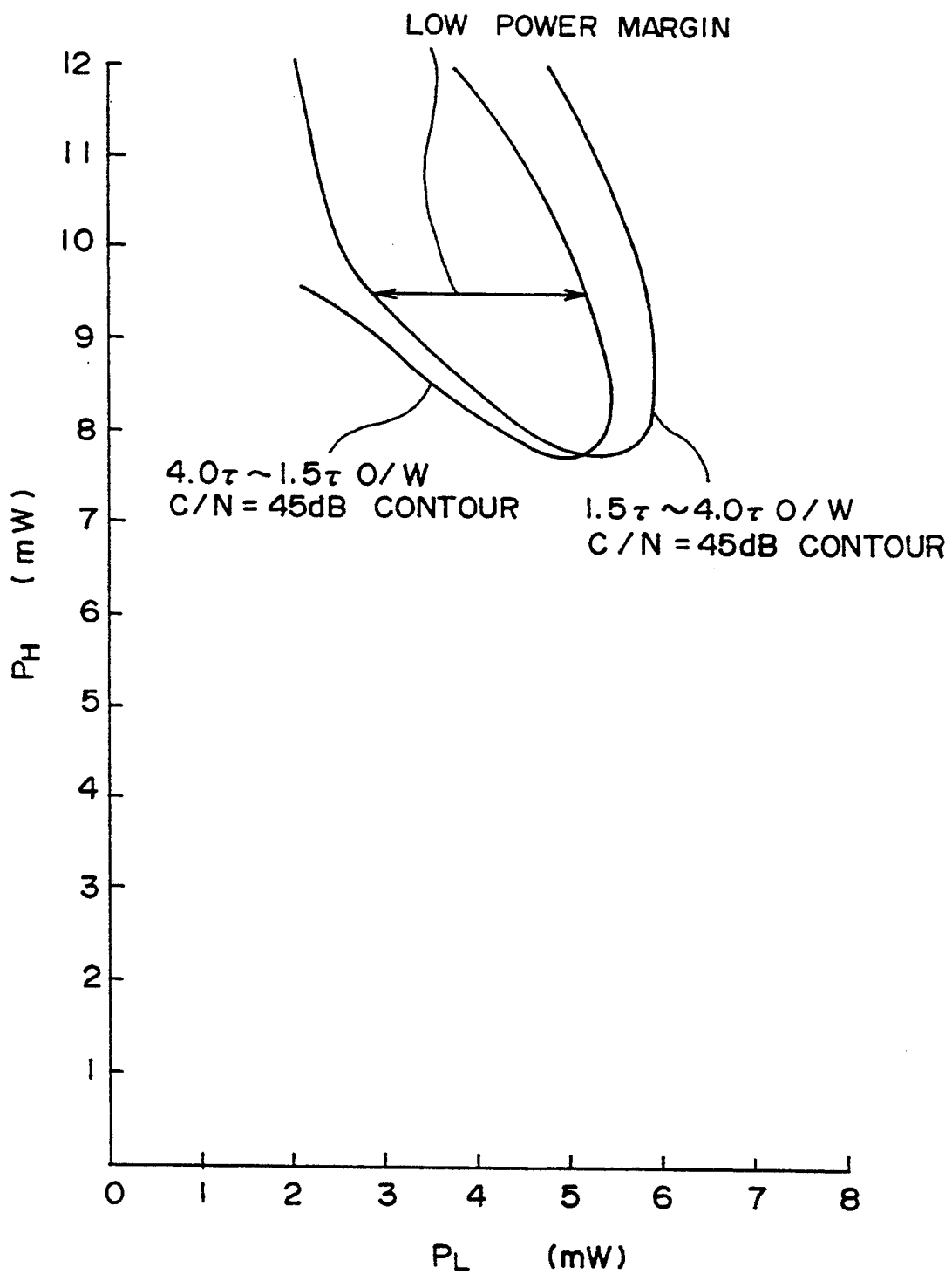
FIG. 27 is a diagram showing a C/N map obtained according to the recording process of the present invention.
Figure 28:
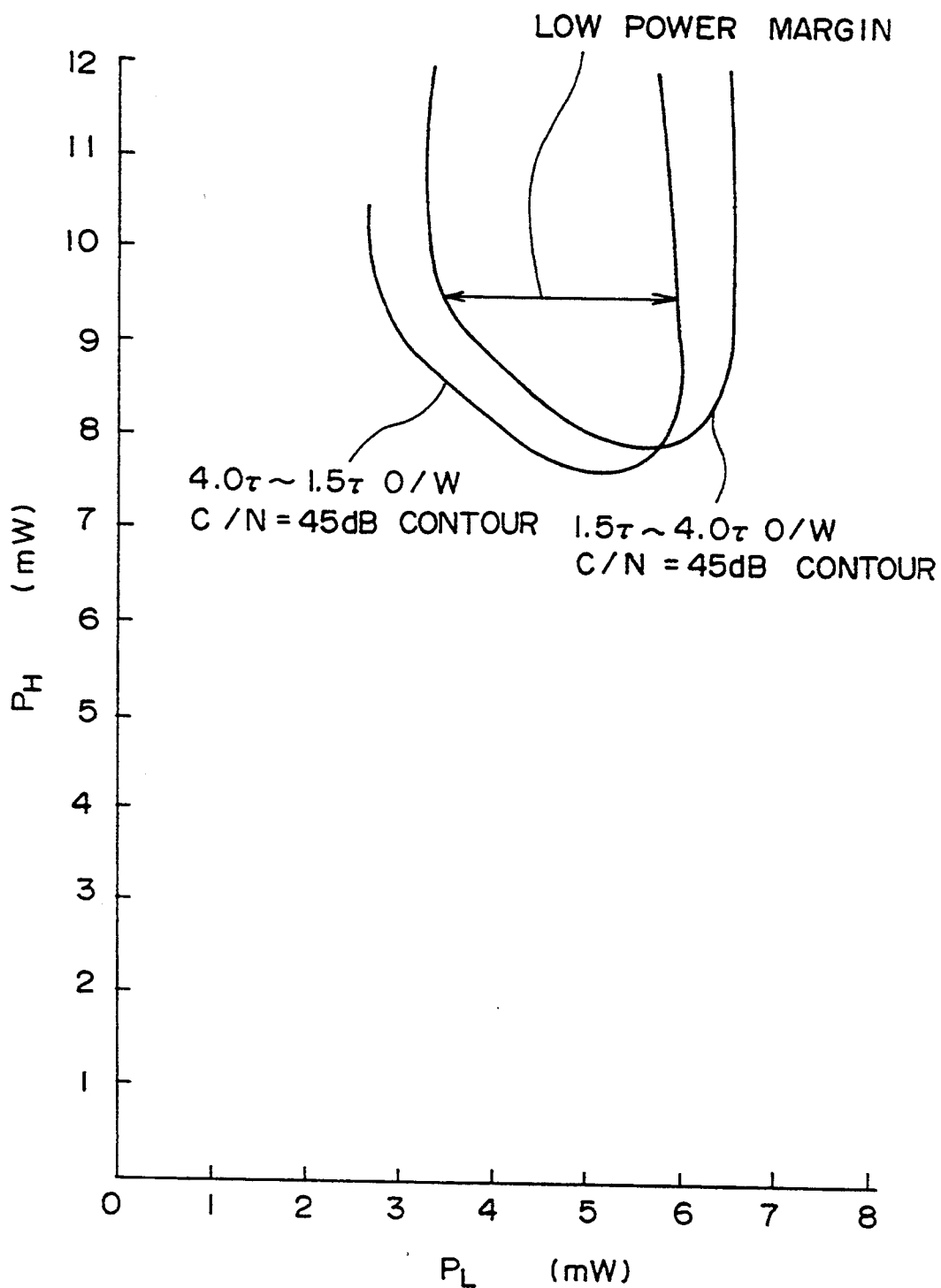
FIG. 28 is a diagram showing another C/N map obtained according to the present invention.

When a magneto-optical disk having a cross sectional structure shown in FIG. 24(B) is employed, on the other hand, the conventional low power margin of about 1.5 mW shown in FIG. 25 is expanded up to about 1.9 mW with the use of the process of the foregoing reference as shown in FIG. 26. In the first embodiment of the present invention, however, this low power margin can be expanded up to about 2.3 mW as indicated in FIG. 27. Further, when the second embodiment of the present invention is employed, the low power margin increases further up to about 2.5 mW as indicated in FIG. 28. It should be noted that the magneto-optical disk of FIG. 24(B) has a construction to include an intermediate layer 65 of $Gd_{32}Fe_{48}Co_{20}$ between the memory layer 62 and the recording layer 63.

Figure 29:
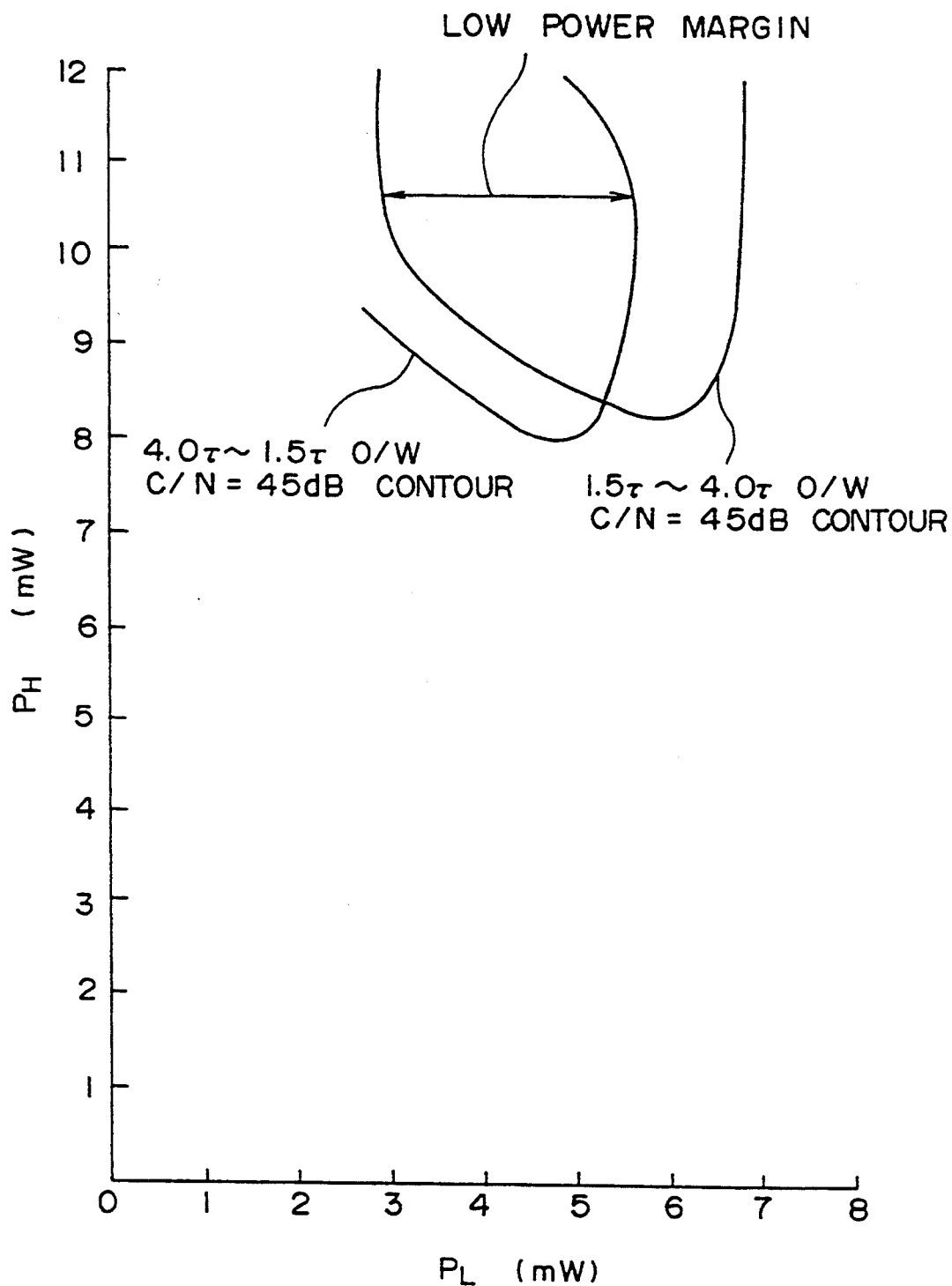
FIG. 29 is a diagram showing a C/N map obtained according to a conventional recording process.
Figure 30:
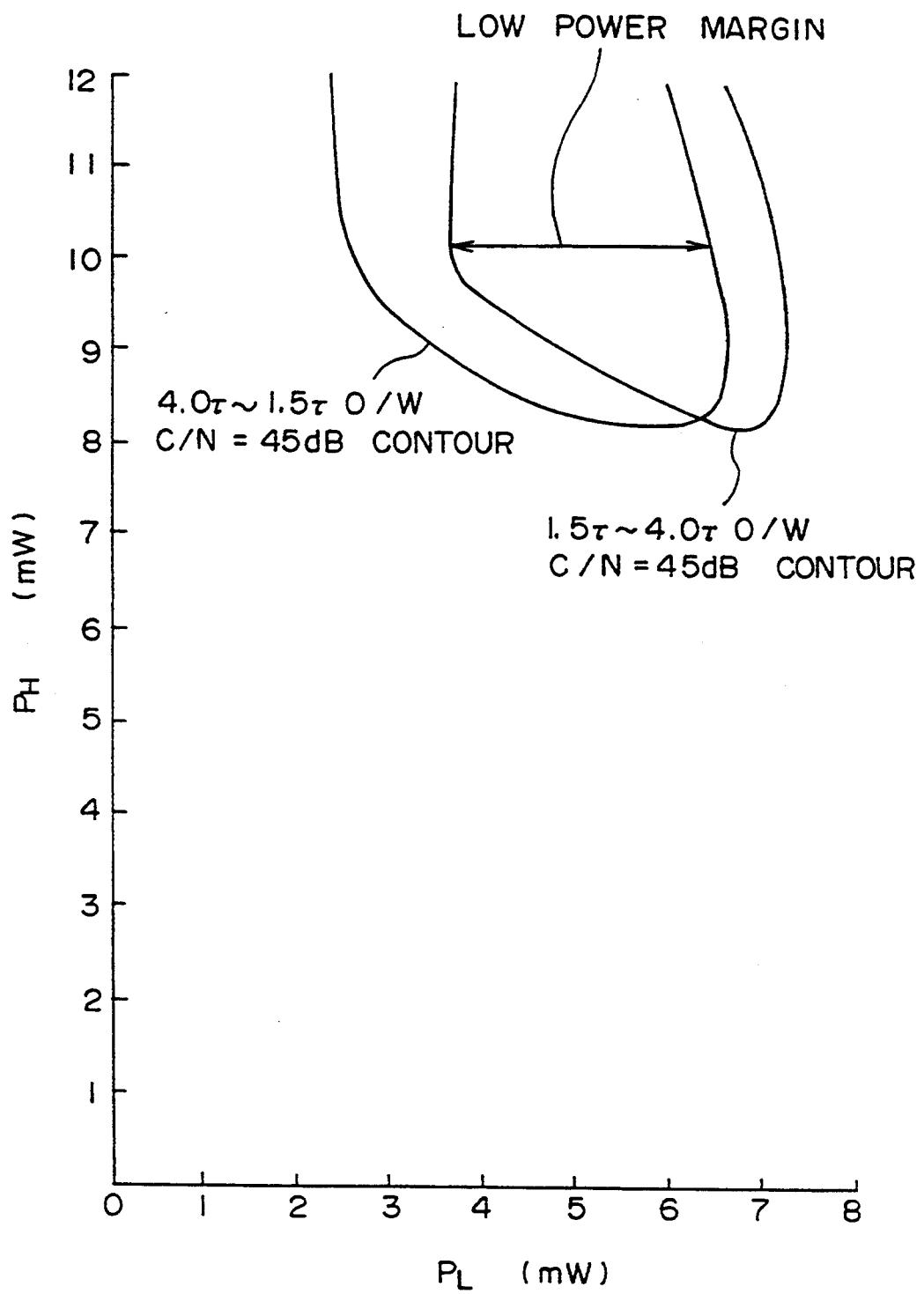
FIG. 30 is a diagram showing a C/N map obtained according to another conventional recording process.
Figure 31:
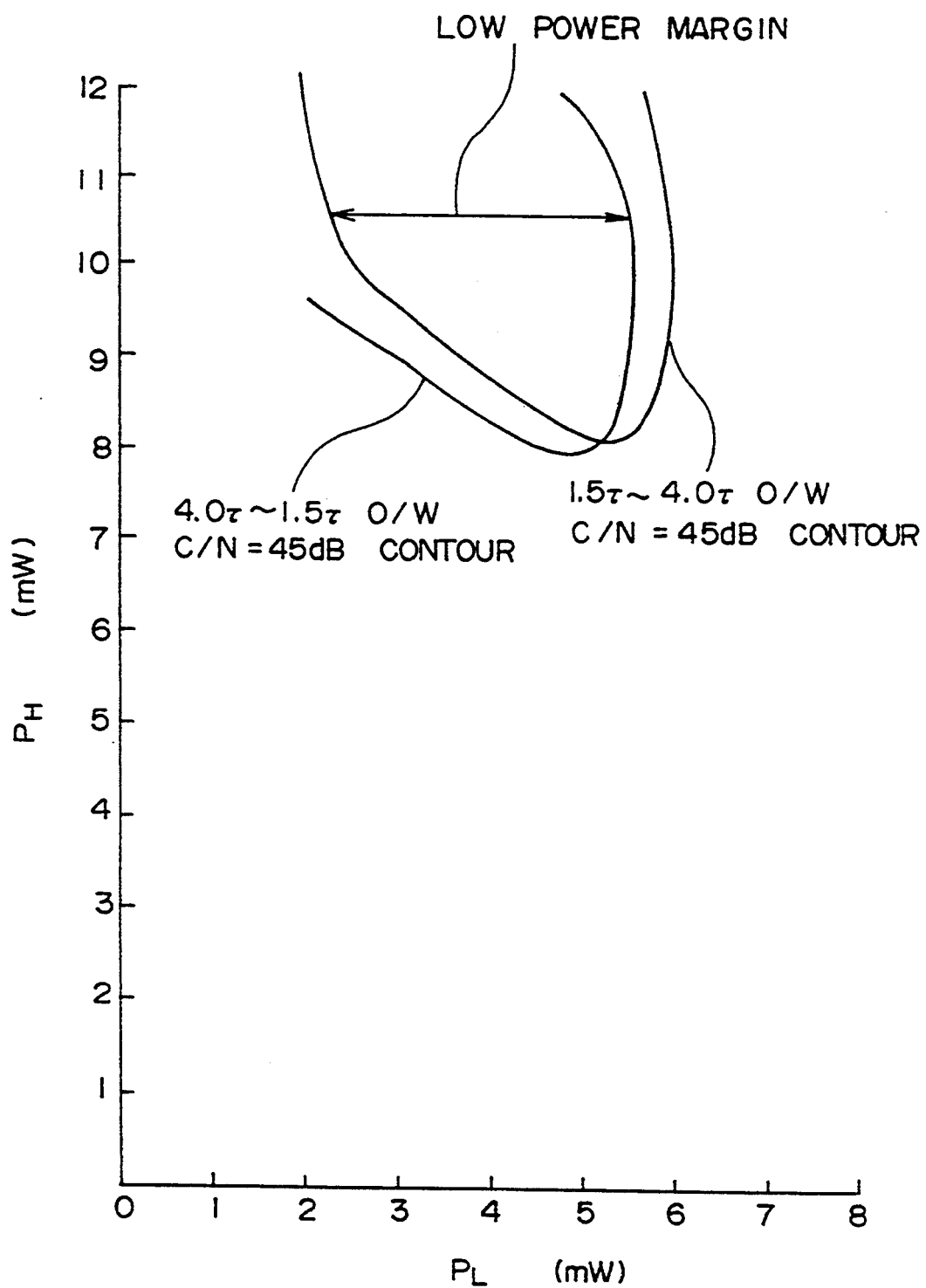
FIG. 31 is a diagram showing a C/N map obtained according to the present invention.
Figure 32:
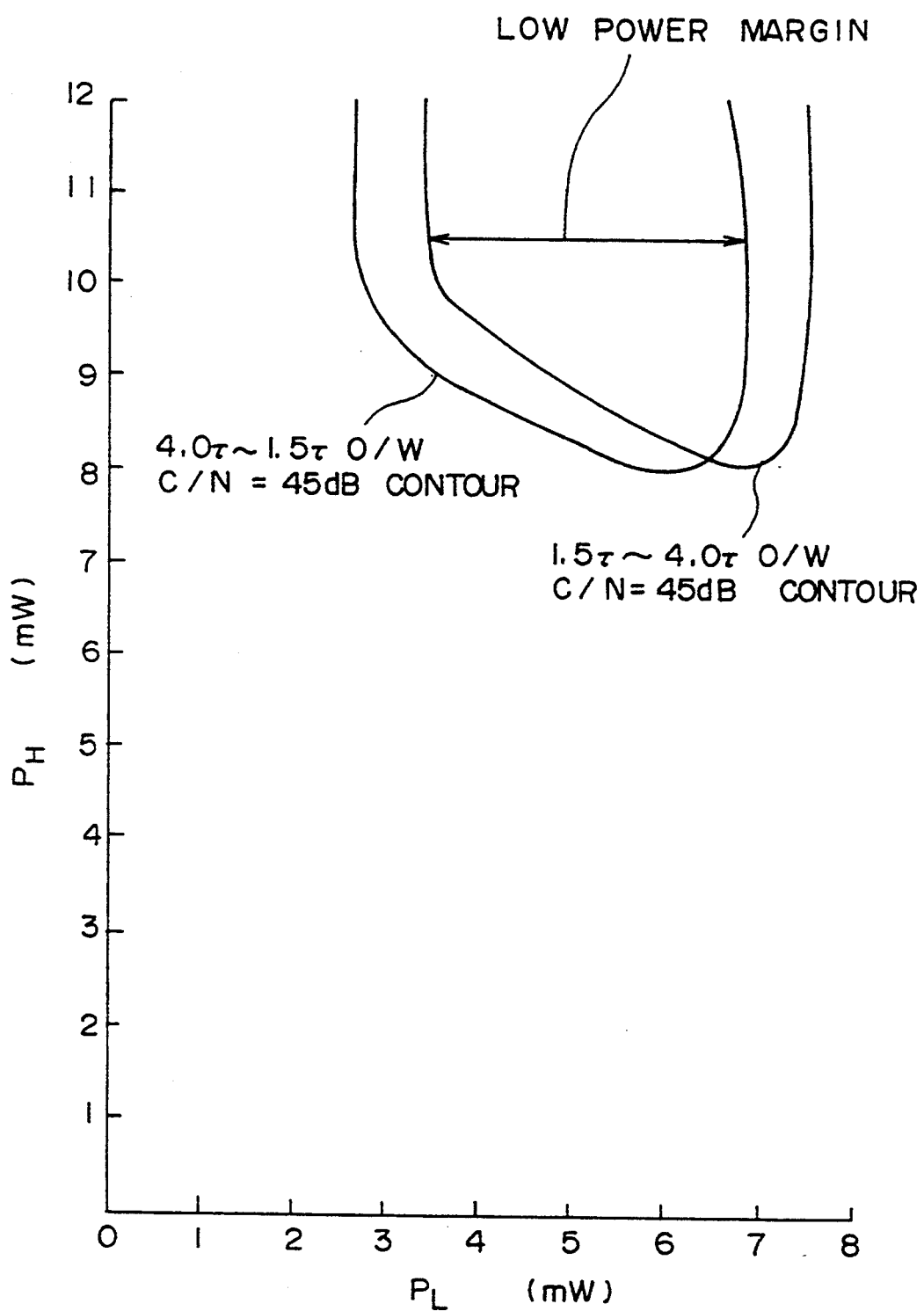
FIG. 32 is a diagram showing another C/N map obtained according to the present invention.

Further, when a magneto-optical disk having a construction shown in FIG. 24(C) is employed wherein a heat sink layer 66 of Al is deposited on the structure of FIG. 24(B), one obtains the C/N map shown in FIG. 29 wherein the low power margin increases up to about 2.7 mW without particular improvement in the recording process. When the process of the foregoing Japanese Laid-open Patent Publication 1-119921 is employed, on the other hand, the low power margin increases up to about 2.8 mW as indicated in FIG. 30. This low power margin can be increased up to about 3.2 mW by using the first embodiment of the present invention as indicated in FIG. 31, while the low power margin is further expanded up to about 3.4 mW in the second embodiment as indicated in FIG. 32.

When a magneto-optical disk having a cross sectional structure shown in FIG. 33(A) is employed, on the other hand, it will be noted that a switch layer 70 of $Tb_{18}Fe_{80}Co_2$ and an initialization layer 71 of $Tb_{27}Fe_{25}Co_{48}$ are provided between the recording layer 63 and the protective layer 64. Thereby, the initialization layer 71 is formed to have a higher Curie temperature than any other layers for providing the initializing magnetic field $H_{ini}$ such that the radiation of the magneto-optical disk with the optical power of $P_H$ does not cause a temperature rise above the Curie point. The switch layer 70, in turn, is provided for increasing the degree of magnetic coupling between the recording layer 63 and the intialization layer 71 as compared with the magnetic coupling between the memory layer 62 and the recording layer 63. Thereby, the magneto-optical disk of FIG. 33(A) eliminates the necessity for providing the initializing magnet 25.

In the structure of FIG. 335(A), it should be noted that one obtains a low power margin of 1.7 mW when no particular improvement is made on the recording process. By using the process of the Japanese Laid-open Patent Publication of 1-119941, the low power margin increases to about 2.0 mW. On the other hand, the first embodiment of the present invention increases the low power margin to about 2.4 mW. Further, the second embodiment of the present invention increases the low power margin further to about 2.6 mW.

FIG. 33(B) shows another construction of the magneto-optical disk wherein an intermediate layer 65 of $Gd_{32}Fe_{48}Co_{20}$ is provided between the memory layer 62 and the recording layer 63. When the magneto-optical disk having the construction of FIG. 33(B) is used, one obtains the low power margin of 1.7 mW without particular improvement in the recording process. With the use of the recording process of the foregoing Japenese Laid-open Patent Publication of 1-119941, one can increase the low power margin up to 2.0 mW. Further, the first embodiment of the present invention expands the low power margin to about 2.6 mW. With the use of the second embodiment, the low power margin is further expanded to about 2.6 mW.

As described heretofore, the recording process of the present invention maintains the temperature of the magneto-optical recording medium above the erase temperature but below the write temperature, irrespective of the interval between recording marks. Thereby, one can optimize the recording optical power to a value such that various record pulse patterns are recorded on a magneto-optical recording medium by using a single set of optimized optical powers. Thereby, an optimum overwrite recording can be achieved by using binary or ternary control of the laser optical power, without introducing complex, multiple level control of the optical power of the laser diode.

According to the magneto-optical recording apparatus of the present invention that forms a recording mark on a magneto-optical disk by means of a laser beam such that the optical power is set to a first optical power level when a recording pulse has a first logic value and prohibits the formation of the recording mark when the recording pulse has a second, opposite logic value, one can simplify the construction of the apparatus for setting the optical power level of the laser diode, by controlling the optical power of the laser diode to the foregoing second level in response to the recording pulse having the second logic value and formed immediately adjacent to the recording pulse of the first logic value and by further switching the optical power level between the first level and the second level alternately in response to the recording pulse having the second logic value and formed offset from the recording pulse of the first logic value. Further, the same effect of simplification of construction of the apparatus can be achieved by controlling the optical power of the laser diode to a third optical power level that is smaller than any of the first and second optical power levels in response to the recording pulse having the second logic value and formed immediately adjacent to the recording pulse of the first logic value and by further switching the optical power level between the first level and the second level alternately in response to the recording pulse having the second logic value and formed offset from the recording pulse of the first logic value.

Further, the present invention is not limited to the embodiments described heretofore, but various variations and modifications may be made without departing from the scope of the invention.

What is claimed is:

1. A magneto-optical recording method for recording information on a magneto-optical recording medium in response to a binary recording pulse, said binary recording pulse being modulated such that at least those bits located before and after a bit that has a first logic value, have a second, opposite logic value, said information being recorded on said magneto-optical recording medium by means of a laser beam in the form of a recording mark such that said recording mark is formed, in response to said recording pulse having said first logic value, by radiating said laser beam having a first laser power, and such that formation of said recording mark on said magneto-optical recording medium is suppressed, in response to said recording pulse having said second logic value, by radiating said laser beam that has a second laser power, characterized in that:

said step of irradiating said magneto-optical recording medium with said second laser power is conducted by alternately repeating the steps of:

(a) irradiating said magneto-optical recording medium with said first laser power except for a region of said magneto-optical recording medium immediately adjacent to said recording mark; and (b) irradiating said magneto-optical recording medium with said second laser power; said steps (a) and (b) being repeated for a predetermined number of times to erase information from said magneto-optical recording medium.

2. A magneto-optical recording method, as claimed in claim 1, wherein said magneto-optical recording medium comprises a layered medium carrying thereon magnetic layers that establish a magnetic exchange coupling, said magneto-optical recording medium being overwritten as a result of said magnetic exchange coupling between magnetic layers.

3. A magneto-optical recording method for recording information on a magneto-optical recording medium in response to a binary recording pulse, said binary recording pulse being modulated such that at least those bits located before and after a bit that has a first logic value, have a second, opposite logic value, said information being recorded on said magneto-optical recording medium by means of a laser beam in the form of a recording mark such that said recording mark is formed, in response to said recording pulse having said first logic value, by said laser beam having a first laser power, and such that formation of said recording mark on said magneto-optical recording medium is suppressed, in response to said recording pulse having said second logic value, by said laser beam that has a second laser power, characterized in that: said step of irradiating said magneto-optical recording medium with said second laser power is conducted by conducting the steps of:

(a) irradiating said magneto-optical recording medium with a third laser power that is smaller than any of said first and second laser powers in correspondence to a region of said magneto-optical recording medium that is recorded immediately after recording of said recording mark; and (b) after said step of (a), repeatedly and alternately conducting the steps of: (b-1) irradiating said magneto-optical recording medium (10) with said first laser power except for a region of said magneto-optical recording medium immediately adjacent to said recording mark; and (b-2) irradiating said magneto-optical recording medium with said second laser power; said steps (b-1) and (b-2) being repeated for a predetermined number of times to erase information from said magneto-optical recording medium.

4. A magneto-optical recording apparatus for recording information on a magneto-optical recording medium in the form of a recording mark in response to binary recording pulses, comprising:

a laser diode supplied with said binary recording pulses for producing a modulated laser beam in response thereto, said binary recording pulses including bits and being modulated such that at least those bits located before and after a bit that has a first logic value, have a second, opposite logic value;

an optical system for irradiating said magneto-optical recording medium with said laser beam produced by said laser diode such that said laser beam has a first laser power when said recording pulse has said first logic value and such that said laser beam has a second laser power when said recording pulse has said second logic value, said first laser power being set such that recording of said recording mark upon said magneto-optical is achieved, said second laser power being set such that recording of said recording mark upon said magneto-optical recording medium is suppressed; and laser diode control means supplied with said binary recording pulses for producing a pulse train including a plurality of pulses each having a pulse width smaller than a period of said bit having said first logic value, said laser diode control means producing said pulse train in correspondence to the bit having said second logic value, said plurality of pulses forming said pulse train including therein a first pulse having said first logic value and a second pulse having said second logic value such that said first pulse and said second pulse are repeated alternately, said laser diode control means driving said laser diode is switched alternately between said first laser power and said second laser power in response to said first and second pulses of said pulse train, said laser diode control means further driving said laser diode such that said laser power is set to said first laser power in response to said bit having said first logic value and such that said laser power is set to said second laser power in correspondence to said bit having said second logic value and located immediately adjacent to said bit of said first logic value.

5. A magneto-optical recording apparatus as claimed in claim 4, wherein said laser diode control means produces said pulse train in correspondence to the bit having said second logic value such that said pulse train includes a third pulse having a level different from either of said first and second pulses and such that said third pulse is formed immediately after said bit having said first logic value, said laser diode control means producing thereby said first and second pulses alternately after said third pulse, and wherein said laser diode control means drives said laser diode in response to said third pulse with a third power smaller than either of said first and second laser powers.

6. A magneto-optical recording apparatus as claimed in claim 5, wherein said magneto-optical recording medium comprises a layered medium carrying thereon magnetic layers that establish a magnetic exchange coupling, said magneto-optical recording medium being overwritten as a result of said magnetic exchange coupling between the magnetic layers.

* * * * *